United States Patent
Tatsumi et al.

(10) Patent No.: US 8,724,450 B2
(45) Date of Patent: May 13, 2014

(54) NETWORK RELAY SYSTEM AND METHOD OF CONTROLLING A NETWORK RELAY SYSTEM

(75) Inventors: Tomoyoshi Tatsumi, Tsuchiura (JP); Shingo Sugawara, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 72 days.

(21) Appl. No.: 13/303,945

(22) Filed: Nov. 23, 2011

(65) Prior Publication Data
US 2012/0127853 A1    May 24, 2012

(30) Foreign Application Priority Data

Nov. 24, 2010 (JP) .................................. 2010-261378
Sep. 26, 2011 (JP) .................................. 2011-208545

(51) Int. Cl.
*G01R 31/08* (2006.01)

(52) U.S. Cl.
USPC .......................................... 370/217; 370/242

(58) Field of Classification Search
None
See application file for complete search history.

(56) References Cited

U.S. PATENT DOCUMENTS

| | | | |
|---|---|---|---|
| 6,058,116 A | 5/2000 | Hiscock et al. | |
| 6,195,349 B1 | 2/2001 | Hiscock et al. | |
| 7,139,267 B2 | 11/2006 | Lu et al. | |
| 2008/0240133 A1* | 10/2008 | Tanaka | 370/401 |
| 2010/0265849 A1* | 10/2010 | Harel | 370/256 |
| 2010/0316053 A1* | 12/2010 | Miyoshi et al. | 370/392 |
| 2011/0080855 A1* | 4/2011 | Fung | 370/256 |
| 2012/0057590 A1 | 3/2012 | Shiraki | |
| 2012/0128005 A1 | 5/2012 | Tatsumi et al. | |

FOREIGN PATENT DOCUMENTS

| | | |
|---|---|---|
| JP | 2007-189476 A | 7/2007 |
| JP | 2009-290271 A | 12/2009 |
| JP | 2010-288168 A | 12/2010 |

OTHER PUBLICATIONS

U.S. Appl. No. 13/303,824; First Named Inventor: Tomoyoshi Tatsumi; Title: "Network Relay System and Method of Automatically Setting a Network Relay System", filed Nov. 23, 2011.
Japanese Office Action dated Dec. 10, 2013 (and English translation thereof) in counterpart Japanese Application No. 2010-261378.

\* cited by examiner

*Primary Examiner* — David Oveissi
(74) *Attorney, Agent, or Firm* — Holtz, Holtz, Goodman & Chick, PC

(57) ABSTRACT

A network relay system (10) includes a plurality of IFSs (14) and a plurality of FSs (16). The IFSs (14a to 14x) are each connected to the FSs (16a to 16h) through physical lines. In the IFSs (14), an LAG is set for ports connected to the FSs (16). The IFSs (14) and the FSs (16) transmit/receive a detection frame to/from each other, and when the detection frame fails to be received, it is determined that a failure has occurred within the network relay system (10). When one of the FSs (16) determines that a failure has occurred, the one of the FSs (16) transmits a failure notification frame to the plurality of IFSs (14), and each of the plurality of IFSs (14) excludes the port that has received the failure notification frame from the LAG.

14 Claims, 16 Drawing Sheets

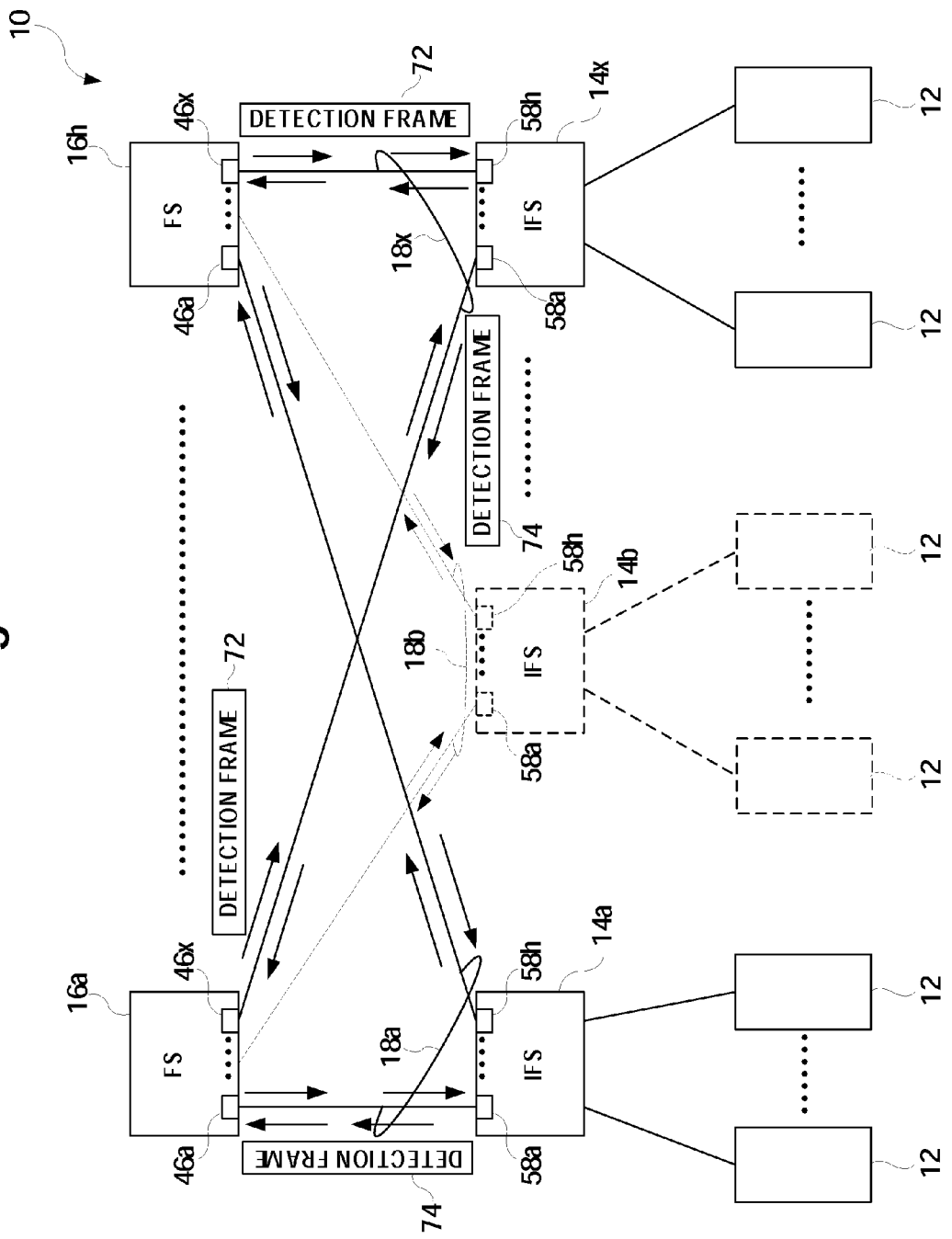

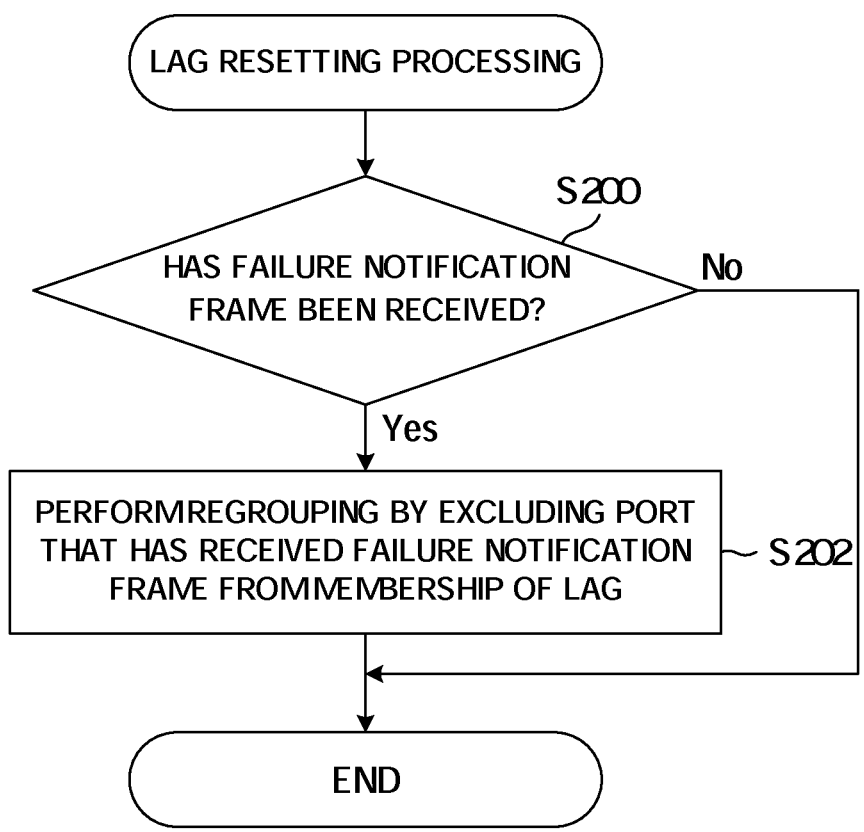

Fig.9A

| LAG ASSIGNED PORT | LAG ID |
|---|---|
| 58a | LAG18a |
| 58b | |
| 58c | |
| 58d | |
| 58e | |
| 58f | |
| 58g | |
| 58h | |

Fig.9B

| LAG ASSIGNED PORT | LAG ID |
|---|---|
| 58b | LAG18a |
| 58c | |
| 58d | |
| 58e | |
| 58f | |
| 58g | |
| 58h | |

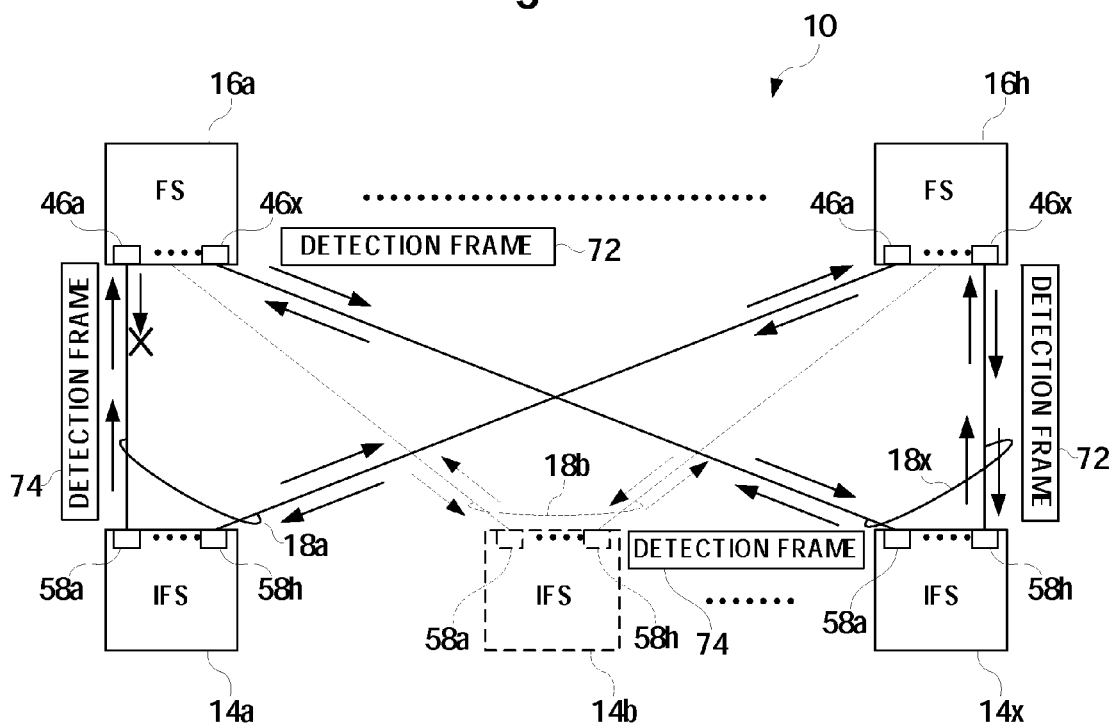
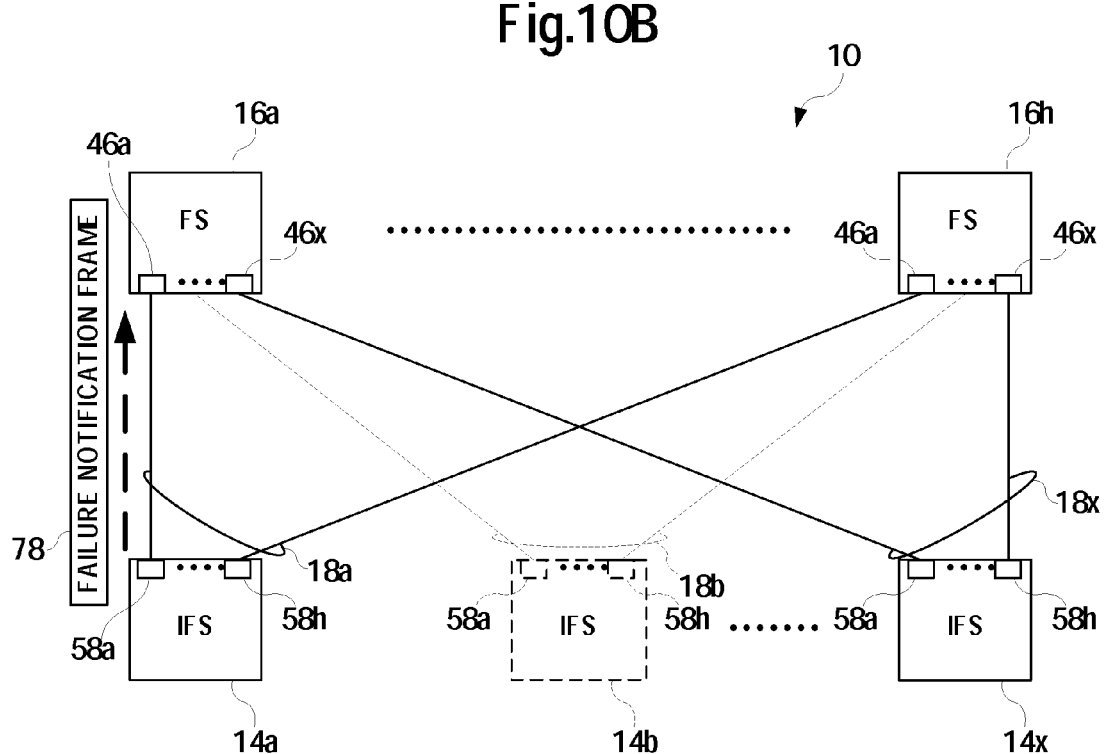

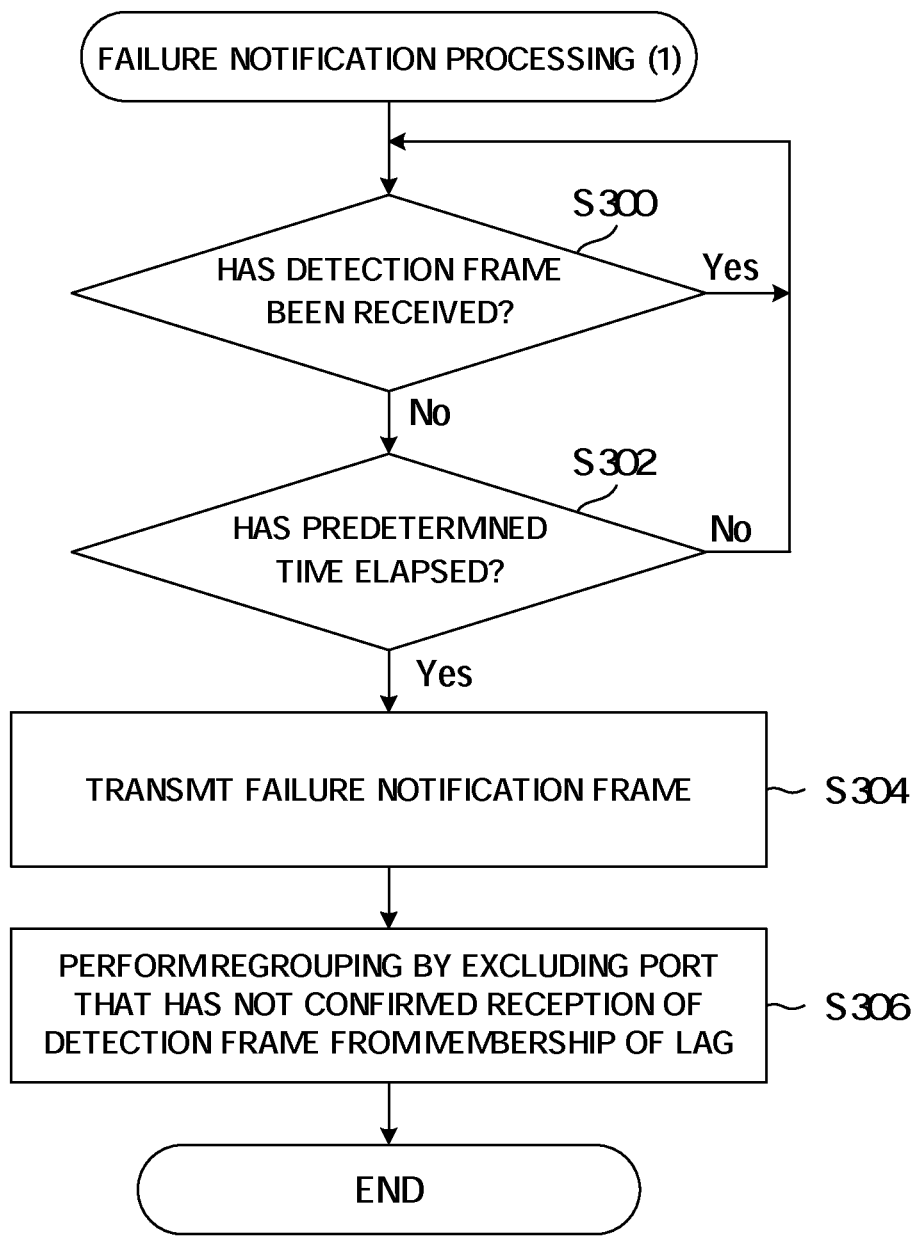

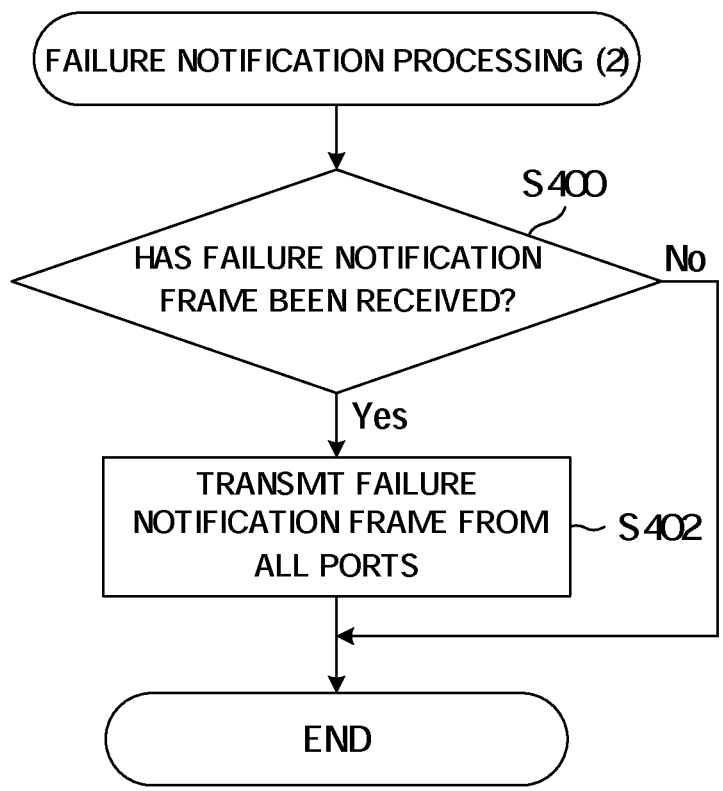

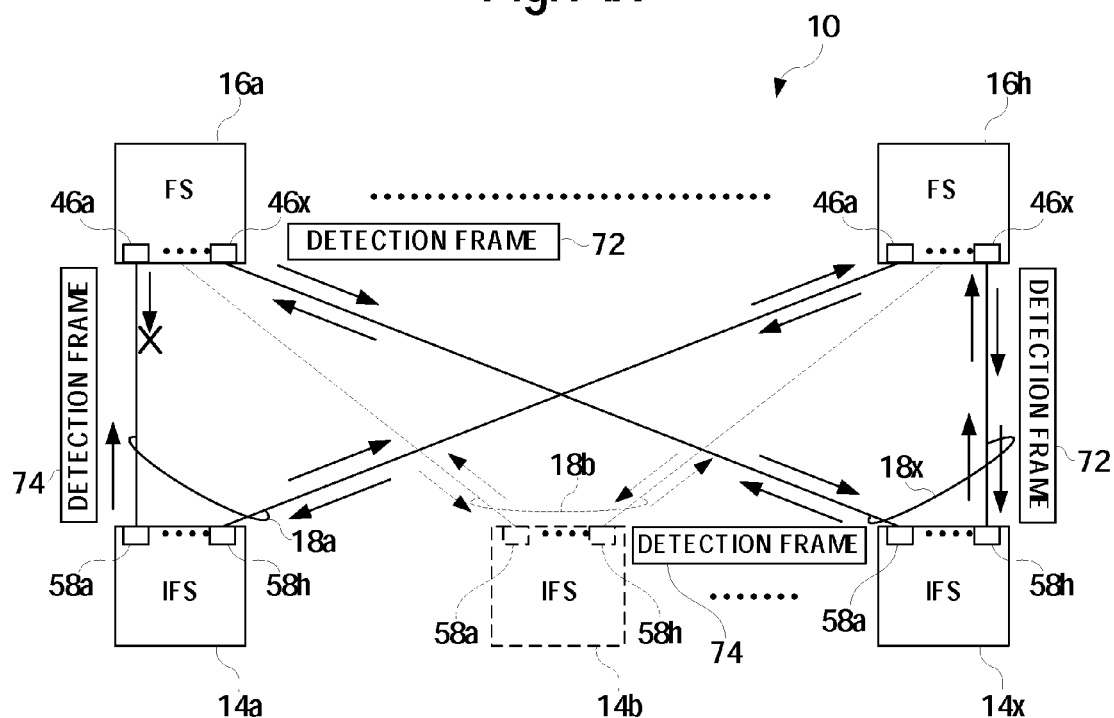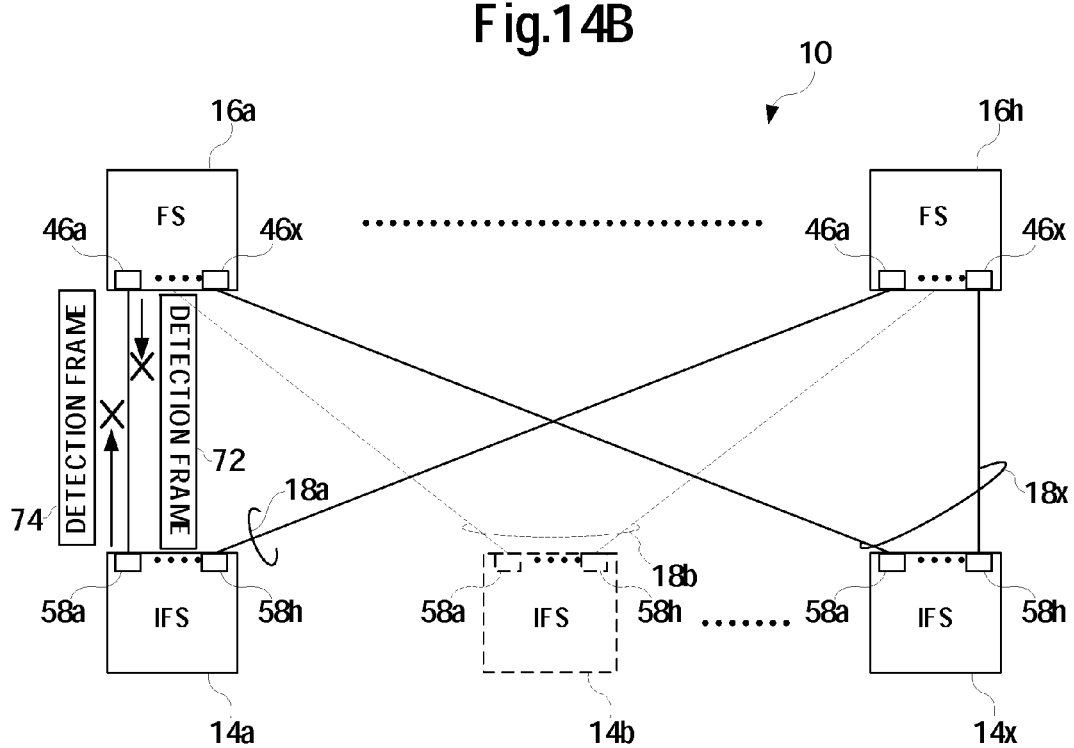

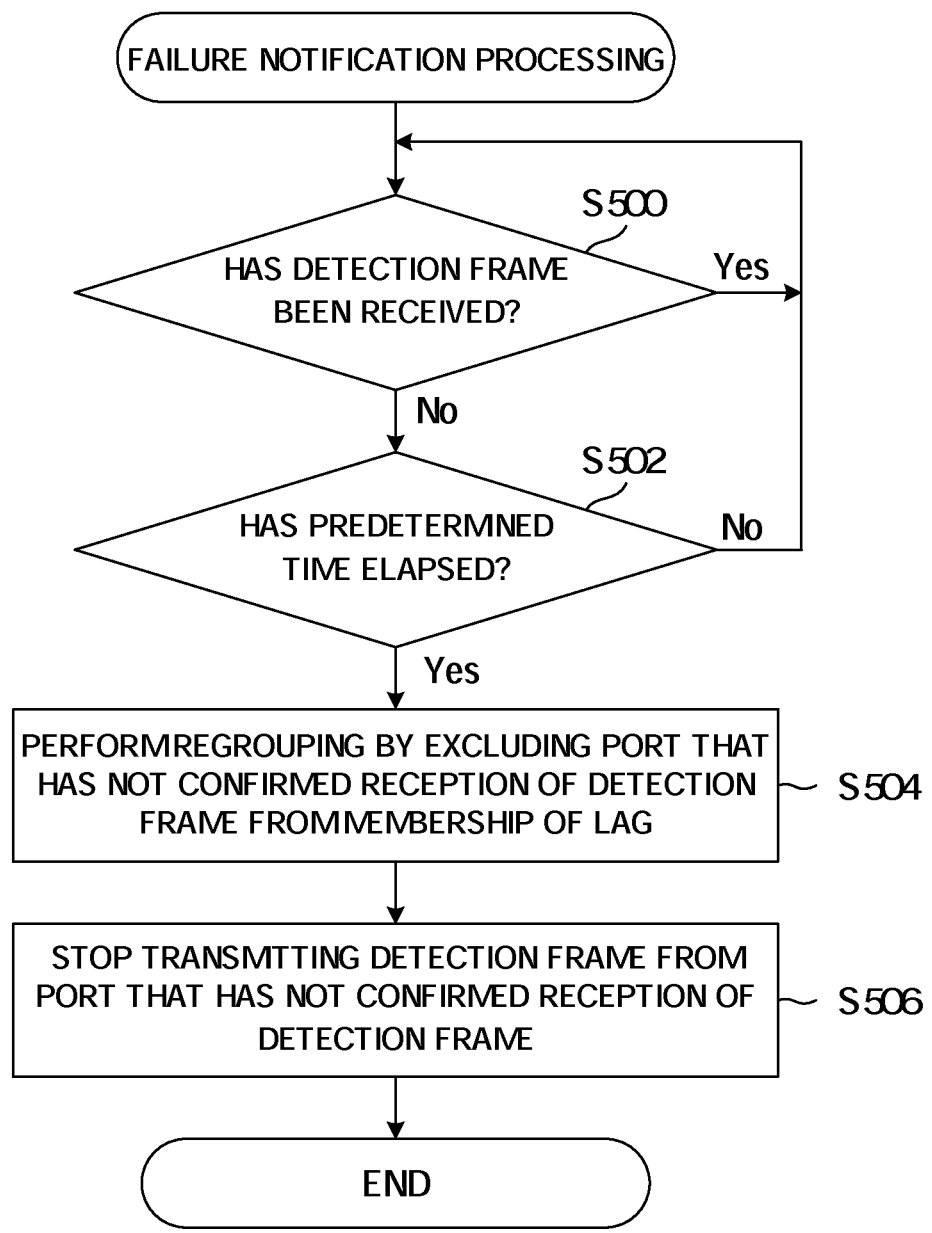

NETWORK RELAY SYSTEM AND METHOD OF CONTROLLING A NETWORK RELAY SYSTEM

BACKGROUND OF THE INVENTION

1. Field of the Invention

The present invention relates to a network relay system and a method of controlling a network relay system.

2. Description of the Related Art

Up to now, there is known a system in which a first network relay apparatus group including a plurality of network relay apparatuses functions as a fabric node and a second network relay apparatus group including a plurality of network relay apparatuses functions as a line node (see, for example, FIG. 8 of Japanese Patent Application Laid-open No. 2009-290271).

With a conventional technology, it is conceivable that a failure may occur in any one of physical lines that connect between the network relay apparatuses included in the first network relay apparatus group and the network relay apparatuses included in the second network relay apparatus group.

SUMMARY OF THE INVENTION

The present invention provides a network relay system including a plurality of interface switches and a plurality of fabric switches connected to the plurality of interface switches, in which a communication path can be switched when a failure occurs. The present invention also provides a method of controlling the network relay system.

According to a first aspect of the present invention, there is provided a network relay system including: a plurality of interface switches; and a plurality of fabric switches connected to the plurality of interface switches. The plurality of interface switches each include an LAG setter for setting a link aggregation group for ports connected to the plurality of fabric switches, the plurality of fabric switches each include a failure notification frame transmitter for transmitting a first failure notification frame to the plurality of interface switches, and the LAG setter of each of the plurality of interface switches excludes the port that has received the first failure notification frame from the link aggregation group in a case where the first failure notification frame has been received.

According to a second aspect of the present invention, there is provided a method of controlling a network relay system, the network relay system including a plurality of interface switches and a plurality of fabric switches connected to the plurality of interface switches. The method includes: previously setting a link aggregation group for ports connected to the plurality of fabric switches in each of the plurality of interface switches; transmitting a first failure notification frame from each of the plurality of fabric switches to the plurality of interface switches; and excluding, by each of the plurality of interface switches, the port that has received the first failure notification frame from the link aggregation group in a case where the each of the plurality of interface switches has received the first failure notification frame.

Further scope of applicability of the present invention will become apparent from the detailed description given hereinafter. The detailed description and embodiments are only given as examples though showing preferred embodiments of the present invention, and therefore, from the contents of the following detailed description, changes and modifications of various kinds within the spirits and scope of the invention will become apparent to those skilled in the art.

BRIEF DESCRIPTION OF THE DRAWINGS

The present invention will be fully understood from the following detailed description and the accompanying drawings. The accompanying drawings only show examples and are not intended to restrict the present invention. In the accompanying drawings:

FIG. 4 is a diagram illustrating a basic operation example of the network relay system;

FIG. 8 is a flowchart illustrating a method of realizing resetting of a link aggregation group illustrated in FIG. 6;

FIGS. 9A and 9B are diagrams respectively illustrating LAG setting tables of each IFS obtained before and after a communication failure occurs in Operation Example 1;

FIGS. 10A and 10B and FIGS. 11A and 11B are diagrams illustrating Operation Example 2 performed by the network relay system in the failure detection;

FIG. 12 is a flowchart illustrating a method of realizing failure notification illustrated in FIGS. 10A and 10B;

FIG. 13 is a flowchart illustrating a method of realizing failure notification illustrated in FIGS. 11A and 11B;

FIGS. 14A and 14B and FIGS. 15A and 15B are diagrams illustrating Operation Example 3 performed by the network relay system in the failure detection; and FIG. 16 is a flowchart illustrating a method of realizing failure notification illustrated in FIGS. 14A and 14B.

DETAILED DESCRIPTION

Hereinafter, an embodiment of the present invention is described with reference to the accompanying drawings.

Figure 1:
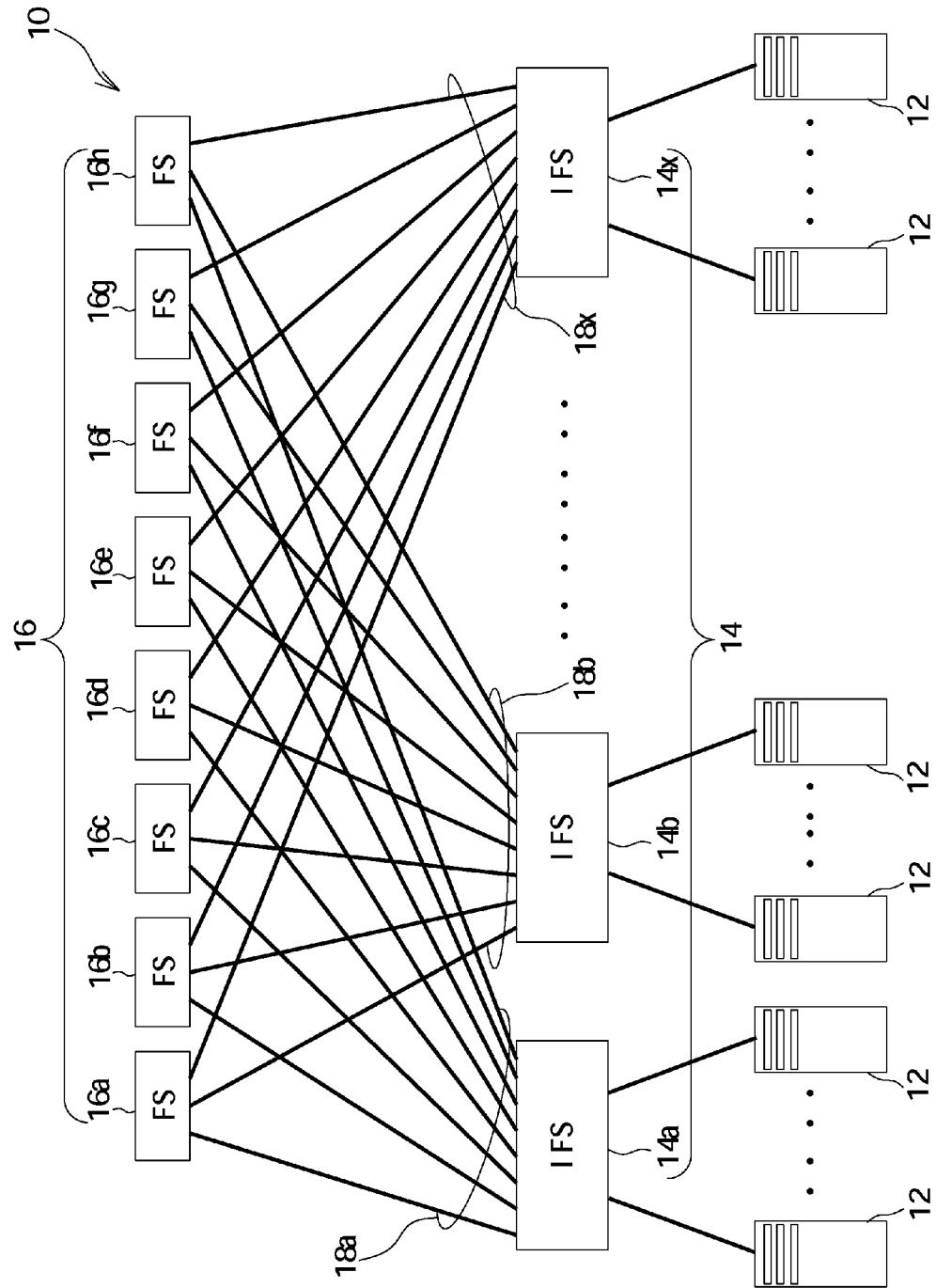
FIG. 1 is a diagram schematically illustrating a structural example of a network relay system.

FIG. 1 is a diagram schematically illustrating a structural example of a network relay system 10 according to one embodiment. The network relay system 10 is suitable for the purpose of, for example, relaying a network frame that is transmitted/received between a plurality of terminal devices 12 inside the facility such as a data center. The terminal device 12 is, for example, a server or a network switch. Note that, the present invention is not limited to the number or type of connected terminal devices 12.

The network relay system 10 includes a plurality of interface switches, for example, approximately twenty-four interface switches (IFSs) 14a, 14b, . . . , and 14x. Further, the network relay system 10 includes a plurality of fabric switches, for example, eight fabric switches (FSs) 16a to 16h. Note that, the number of IFSs 14a to 14x and the number of FSs 16a to 16h mentioned here are merely an example, to which the present invention is not limited.

Further, hereinafter, the "IFSs 14a to 14x" serving as the interface switches may be referred to as "IFSs 14", and the "FSs 16a to 16h" serving as the fabric switches may be referred to as "FSs 16".

In this embodiment, for example, box-type switching hubs are used as the IFSs 14a to 14x and the FSs 16a to 16h. The switching hub used here has, for example, a data transfer function at Layer 2 and Layer 3 of the open systems interconnection (OSI) reference model. Note that, basic structures and functions of the IFSs 14a to 14x and the FSs 16a to 16h may be common to one another.

The plurality of terminal devices 12 are each connected to any one of the IFSs 14a to 14x in a distributed manner. Note that, the number of terminal devices 12 connected to each of the IFSs 14a to 14x may not be uniform. Further, there is no restriction on which type of terminal device 12 is to be connected to which of the IFSs 14a to 14x. In addition, the terminal device 12 may be a personal computer, a workstation, or the like other than the server.

In the network relay system 10, the IFSs 14a to 14x are each connected to the FSs 16a to 16h through physical lines. The physical line is, for example, an optical fiber cable or a twisted pair cable. Note that, in FIG. 1, reference numerals for the individual physical lines are omitted. Further, some of the IFSs 14a to 14x are omitted from the illustration, but are each connected to the FSs 16a to 16h through the physical lines as well. The physical lines are connected to ports (not shown) of the IFSs 14a to 14x and the FSs 16a to 16h.

In each of the IFSs 14a to 14x, a link aggregation group, that is, one of LAGs 18a, 18b, . . . , and 18x is set for the ports connected to the FSs 16a to 16h. Link aggregation is a function of handling a plurality of physical lines as logically one line. In each of the IFSs 14a to 14x, the plurality of ports for which one of the LAGs 18a, 18b, . . . , and 18x is set work as logically one port.

To transmit a network frame received from each of the terminal devices 12 to the FSs 16a to 16h, each of the IFSs 14a to 14x decides, in accordance with a predetermined algorithm, which port within the corresponding one of the LAGs 18a, 18b, . . . , and 18x the network frame is to be transmitted from. In accordance with the predetermined algorithm, when a network frame is received from the connected terminal device 12, an arithmetic operation (for example, the four fundamental operations) is performed by using MAC addresses, IP addresses, and the like indicated by destination information and transmission source information that are included in the network frame, and a port number to be used for transmission is decided based on a value thus obtained. At this time, an identification number (INDEX) may be set for each port within each of the LAGs 18a, 18b, . . . , and 18x in advance, and the value obtained by the above-mentioned arithmetic operation may be associated with the identification number of the port. In any case, each of the IFSs 14a to 14x uniquely decides the port to be used for the transmission of the network frame based on specific information within the network frame to thereby balance the load caused when the network frame received from the terminal device 12 is transmitted to the FSs 16a to 16h and secure a communication band that is necessary for the network relay system 10 as a whole. Further, in the network relay system 10 according to this embodiment, in accordance with the above-mentioned algorithm, a communication path at a time of transmission (upstream) is matched with a communication path at a time of reception (downstream) when the transmission/reception of a network frame is performed between arbitrary two terminal devices 12.

For example, consideration is given to a case where two terminal devices 12 that are respectively connected to two different IFS 14a and the IFS 14b transmit/receive a network frame to/from each other. In this case, in accordance with the above-mentioned algorithm, the network frame transmitted from the terminal device 12 (transmission source) connected to the IFS 14a is, for example, transferred to the IFS 14b via a specific FS 16d and then transferred from the IFS 14b to the terminal device 12 that is a transmission destination (destination). At this time, the IFS 14b has the LAG 18b set for all ports opposed to the FSs 16a to 16h, and hence the network frame is not to be transmitted by return from the IFS 14b to within the LAG 18b.

On the other hand, in a case where the terminal device 12 connected to the IFS 14b is the transmission source, the network frame is transmitted from the IFS 14b to the FS 16d and further transmitted from the FS 16d to the terminal device 12 that is the transmission destination via the IFS 14a. Also here, in the same manner, the IFS 14a has the LAG 18a set for all the ports opposed to the FSs 16a to 16h, and hence the network frame is not to be transmitted by return to within the LAG 18a.

In this manner, in the case where the network frame is transmitted/received between the two terminal devices 12 connected to the two different IFS 14a and the IFS 14b, the same port is used in both directions by the IFS 14a and the IFS 14b that relay the network frame. Here, the combination of the two terminal devices 12 connected to the IFS 14a and the IFS 14b is taken as an example, and similarly at the time of transmission/reception between any other combination of the terminal devices 12, the same communication path and the same port are used in both directions at the time of transmission and at the time of reception.

Further, in a case where a virtual local area network (VLAN) is set for the respective terminal devices 12 connected to the network relay system 10, the IFSs 14a to 14x and the FSs 16a to 16h each perform the transmission/reception of the network frame by using a tagged VLAN in principle. At this time, all VLAN information pieces assigned to the respective terminal devices 12 are registered in the respective ports of the FSs 16a to 16h. Then, the IFSs 14a to 14x and the FSs 16a to 16h each transmit the network frame with the VLAN information piece tagged in accordance with the individual received network frame. With this arrangement, even when the VLAN is set for the respective terminal devices 12, the same communication path is used at the time of transmission and at the time of reception between the different terminal devices 12.

Described above are the basic structure of the network relay system 10 according to this embodiment and a network frame relay operation performed therein. In addition, in this embodiment, a function (failure detection function) of quickly detecting any failure (for example, fault in physical line) that occurs in a communication state between the plurality of IFSs 14a to 14x and the plurality of FSs 16a to 16h is realized only by the respective IFSs 14a to 14x and the respective FSs 16a to 16h.

Hereinafter, detailed description is made of configurations of the IFSs 14a to 14x and the FSs 16a to 16h. As has already been described, the "IFSs 14a to 14x" and the "FSs 16a to 16h" may be referred to generically as the "IFSs 14" and the "FSs 16", respectively, in the following description.

(Fabric Switch)

Figure 2:
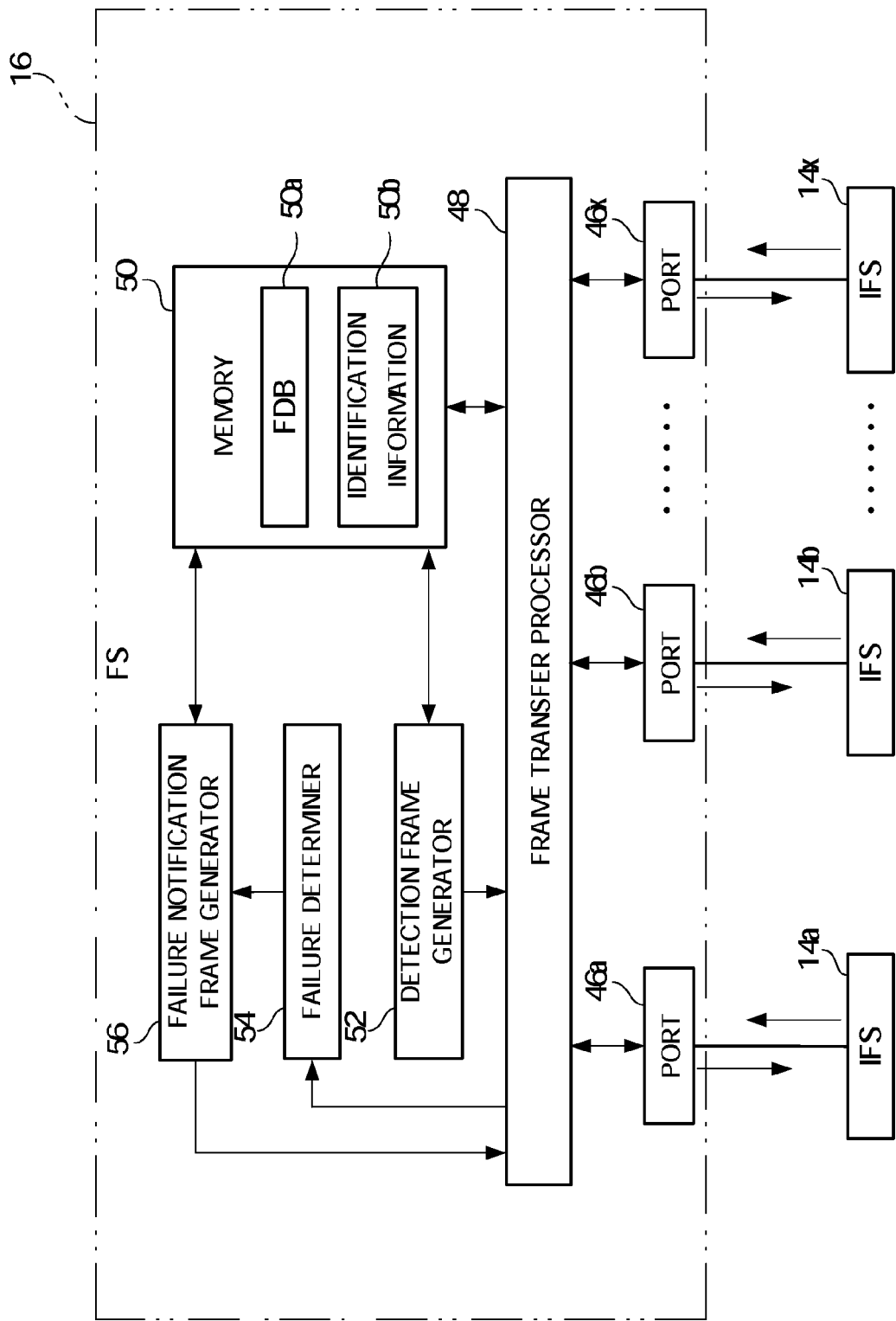
FIG. 2 is a block diagram schematically illustrating a functional configuration of an FS.

FIG. 2 is a block diagram schematically illustrating a functional configuration of the FS 16. That is, the individual FSs 16a to 16h have the same basic configuration and function.

The FS 16 includes a plurality of ports 46a, 46b, . . . , and 46x. It is assumed that the number of ports of the FS 16 covers the number of IFSs 14a to 14x placed within the network relay system 10. Note that, the "ports 46a, 46b, . . . , and 46x" may be referred to also as "ports 46" in the following description. Further, the number of ports 46 is not limited to the number illustrated in the drawing.

In addition to the ports 46, the FS 16 includes a frame transfer processor 48 and a memory 50.

Of those, the memory 50 is made up of, for example, a rewritable random-access memory (RAM). The memory 50 stores a forwarding database (FDB) 50a. Further, the memory 50 stores identification information 50b for identifying the FSs 16 and the ports 46.

The ports 46 are respectively connected to the IFSs 14a to 14x. Upon reception of the network frame transmitted from each of the IFSs 14a to 14x, the port 46 transfers the received network frame to the frame transfer processor 48.

Further, each of the ports 46 transmits the network frame transferred from the frame transfer processor 48 to one of the IFSs 14a to 14x.

The frame transfer processor 48 is implemented by, for example, an integrated circuit such as a field programmable gate array (FPGA) or an application-specific integrated circuit (ASIC).

The frame transfer processor 48 transfers the network frame to the port 46 of a transfer destination based on the destination information within the network frame. Further, the frame transfer processor 48 creates and updates the FDB 50a based on the transmission source information within the network frame.

The transmission source information within the network frame received on the port 46 and a number assigned to the port 46 that has received the network frame are registered in the FDB 50a in association with each other.

That is, when the network frame is transferred from the port 46, the frame transfer processor 48 relays the network frame to the port 46 of the transfer destination based on the information registered in the FDB 50a.

The FS 16 further includes a detection frame generator 52, a failure determiner 54, and a failure notification frame generator 56 as components for monitoring the communication state (mainly detecting a failure). Of those, the detection frame generator 52 constitutes a detection frame transmitter (second detection frame transmitter) included by each of the FSs 16. Further, the failure determiner 54 constitutes a failure determiner (second failure determiner) included by each of the FSs 16. Further, the failure notification frame generator 56 constitutes a failure notification frame transmitter included by each of the FSs 16.

The detection frame generator 52, the failure determiner 54, and the failure notification frame generator 56 are also implemented by, for example, an integrated circuit such as an FPGA or an ASIC.

The detection frame generator 52 generates a detection frame (second detection frame) in order to monitor the communication state with respect to the IFSs 14a to 14x connected to the ports 46. At this time, the detection frame includes identification information (such as a MAC address) for identifying one of the FSs 16 (individuals of the FSs 16a to 16h) that is the transmission source and identification information (for example, port numbers) for identifying the ports 46a, 46b, . . . , and 46x that transmit the detection frame.

The detection frame generated by the detection frame generator 52 is transmitted from the respective ports 46 to the connected IFSs 14a to 14x via the frame transfer processor 48. At this time, the detection frame is transmitted from the respective ports 46 every predetermined time (for example, every tens of milliseconds to several seconds).

Upon detection of a failure in the communication state, the failure determiner 54 causes the failure notification frame generator 56 to generate a failure notification frame.

Here, in this embodiment, the detection frame is transmitted also from the IFSs 14a to 14x to the connected FSs 16a to 16h every predetermined time (for example, every tens of milliseconds to several seconds). That is, the IFSs 14a to 14x and the FSs 16a to 16h mutually transmit/receive the detection frame and monitor the communication state of each other.

Therefore, when any one of the ports 46 fails to confirm reception of the detection frame within the predetermined time, the failure determiner 54 of the FS 16 determines that a failure has occurred.

The failure notification frame generator 56 generates the failure notification frame (first failure notification frame) in order to notify the IFSs 14a to 14x that a communication failure has occurred. At this time, the failure notification frame includes the identification information 50b stored in the memory 50.

That is, the failure notification frame includes identification information indicating that a communication failure has occurred, identification information for identifying one of the FSs 16a to 16h that is the transmission source, and identification information for identifying the ports 46a, 46b, . . . , and 46x that transmit the failure notification frame.

In the FS 16, the failure notification frame generated by the failure notification frame generator 56 is transmitted from all the ports 46a, 46b, . . . , and 46x connected to the IFSs 14a to 14x via the frame transfer processor 48.

(Interface Switch)

Figure 3:
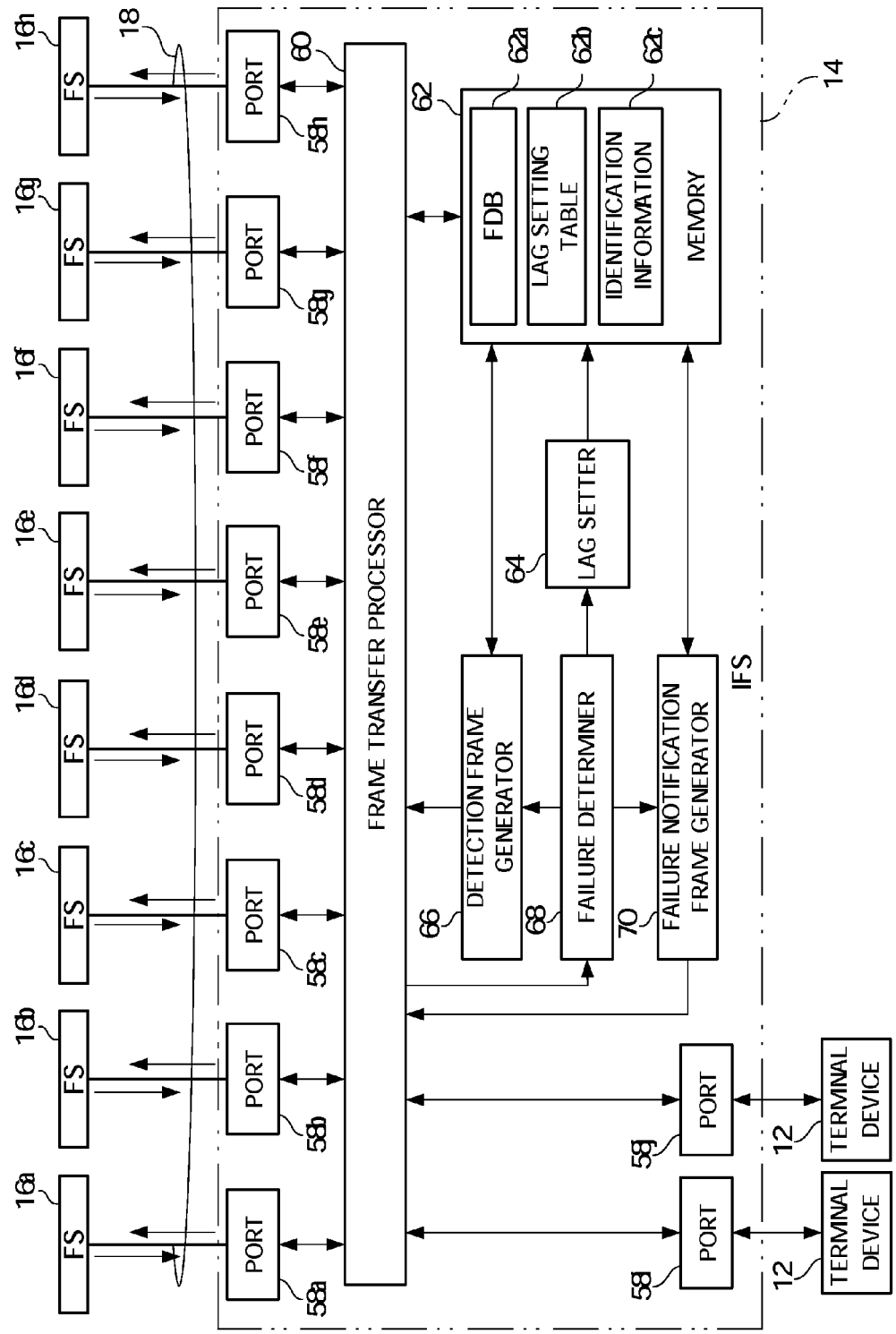
FIG. 3 is a block diagram schematically illustrating a functional configuration of an IFS.

FIG. 3 is a block diagram schematically illustrating a functional configuration of the IFS 14. That is, the individual IFSs 14a to 14x have the same basic configuration and function. Further, the IFSs 14 and the FSs 16 have the same basic configuration and function as the switching hub. On that condition, FIG. 3 illustrates characteristic components as the IFS 14.

The IFS 14 includes a plurality of ports 58a to 58j. Further, the IFS 14 includes a frame transfer processor 60, a memory 62, and an LAG setter 64.

The memory 62 is made up of, for example, a RAM. The memory 62 stores an MB 62a and an LAG setting table 62b. Further, the memory 62 stores identification information indicating that a failure has occurred in the communication state, identification information for identifying the IFSs 14a to 14x, identification information for identifying the ports 58a to 58j, and the like collectively as identification information 62c.

In FIG. 3, the ports 58a to 58h illustrated above the frame transfer processor 60 are connected to the FSs 16a to 16h, respectively. Further, the ports 58i and 58j illustrated below the frame transfer processor 60 are respectively connected to the different terminal devices 12. In the following description, the "ports 58a to 58j" may be referred to also as "ports 58".

In the IFS 14, the FSs 16a to 16h are connected to the ports 58a to 58h, respectively, in an arranged order thereof. Each of the IFSs 14a to 14x illustrated in FIG. 1 is mutually connected to the FSs 16a to 16h basically in the arranged order illustrated in FIG. 3. That is, in this embodiment, it is preferred that the same one of the FSs 16a to 16h be connected to the same port (port assigned the same port number) among the respective IFSs 14a to 14x.

Note that, FIG. 3 illustrates ten ports 58a to 58j, but the number of ports is not limited to the number illustrated in the drawing. Further, it is assumed that the number of ports covers the number of FSs 16a to 16h placed within the network relay system 10.

The ports 58a to 58h transfer the network frame received from the FSs 16a to 16h to the frame transfer processor 60. Further, the ports 58a to 58h transmit the network frame transferred from the frame transfer processor 60 to the connected FSs 16a to 16h.

The other ports 58i and 58j transfer the network frame received from the respective terminal devices 12 to the frame transfer processor 60. Further, the ports 58i and 58j transmit the network frame transferred from the frame transfer processor 60 to the connected terminal devices 12.

The frame transfer processor 60 is implemented by, for example, an integrated circuit such as an FPGA or an ASIC in the same manner as the frame transfer processor 48 of the FS 16 illustrated in FIG. 2.

The frame transfer processor 60 transfers the network frame to the port 58 of the transfer destination based on the destination information within the network frame. Further, the frame transfer processor 60 creates and updates the FDB 62a based on the transmission source information within the network frame.

The transmission source information within the network frame received on the port 58 and a number assigned to the port 58 that has received the network frame are registered in the FDB 62a in association with each other.

The frame transfer processor 60 of the IFS 14 references the FDB 62a to relay the network frame to one of the ports 58i and 58j that is connected to the terminal device 12 that is the transmission destination. Further, the frame transfer processor 60 references the LAG setting table 62b together with the FDB 62a to relay the network frame to one of the ports 58a to 58h that is connected to the FSs 16a to 16h that is the transmission destination.

(Transfer Processing within the Same IFS 14)

For example, it is assumed that the terminal device 12 connected to the port 58i transmits data to the terminal device 12 connected to the other port 58j. In this case, the terminal device 12 that is the transmission source transmits the network frame including the data to the IFS 14. The transmitted network frame is received on the port 58i and transferred to the frame transfer processor 60.

The frame transfer processor 60 references the FDB 62a based on the destination information and the transmission source information that are included in the network frame. At this time, in a case where the destination information indicating the other terminal device 12 is registered in the FDB 62a in association with the port 58j, the frame transfer processor 60 relays the network frame to the port 58j. Then, the port 58j transmits the network frame to the connected terminal device 12.

(Transfer Processing Between Different IFSs 14)

Further, in a case where the terminal device 12 connected to the port 58i transmits data to the terminal device 12 connected to another one of the IFSs 14a to 14x, the network frame transmitted from the terminal device 12 of the transmission source is received on the port 58i and transferred to the frame transfer processor 60.

In a case where the destination information included in the network frame is registered in association with one of the ports 58a to 58h that form the LAG 18, the frame transfer processor 60 references the LAG setting table 62b. Note that here, the "LAGs 18a, 18b, . . . , and 18x" illustrated in FIG. 1 are referred to generically as "LAGs 18".

In accordance with a predetermined algorithm, the frame transfer processor 60 selects the port 58 that is to transmit the network frame from among a plurality of ports 58 registered in the LAG setting table 62b. The frame transfer processor 60 relays the network frame to the selected port 58, and the selected port 58 transmits the network frame to the connected one of the FSs 16a to 16h.

Further, the LAG setter 64 creates and updates the LAG setting table 62b. Specifically, the LAG setter 64 registers the respective ports 58a to 58h connected to the FSs 16a to 16h in the LAG setting table 62b in association with a group number (LAG ID). That is, the respective ports 58 registered in the LAG setting table 62b belong to a common link aggregation group (LAG 18).

The IFS 14 further includes a detection frame generator 66, a failure determiner 68, and a failure notification frame generator 70 as components for monitoring the communication state (mainly detecting a failure). Of those, the detection frame generator 66 constitutes a detection frame transmitter (first detection frame transmitter) included by each of the IFSs 14. Further, the failure determiner 68 constitutes a failure determiner (first failure determiner) included by each of the IFSs 14. Further, the failure notification frame generator 70 constitutes a failure notifier included by each of the IFSs 14.

The LAG setter 64, the detection frame generator 66, the failure determiner 68, and the failure notification frame generator 70 are also implemented by, for example, an integrated circuit such as an FPGA or an ASIC.

In the same manner as the FS 16 illustrated in FIG. 2, the detection frame generator 66 generates a detection frame (first detection frame) in order to monitor the communication state with respect to the FSs 16a to 16h connected to the ports 58a to 58h. At this time, the detection frame includes identification information for identifying one of the IFSs 14a to 14x that is the transmission source and identification information for identifying the ports 58a to 58h that transmit the detection frame. That is, the detection frame generator 66 generates a detection frame that includes identification information 62b stored in the memory 62.

The detection frame generated by the detection frame generator 66 is transmitted from the respective ports 58a to 58h to the connected FSs 16a to 16h via the frame transfer processor 60 every predetermined time (for example, every tens of milliseconds to several seconds).

Upon detection of a failure in the communication state, the failure determiner 68 causes the failure notification frame generator 70 to generate a failure notification frame (second failure notification frame).

Specifically, when any one of the ports 58a to 58h fails to confirm the reception of the detection frame transmitted from the FSs 16a to 16h within the above-mentioned predetermined time, the failure determiner 68 determines that a failure has occurred in the communication state.

When a failure has been determined, the failure notification frame generator 70 generates the failure notification frame in order to notify the FSs 16a to 16h that a failure has occurred in the communication state. At this time, the failure notification frame includes identification information indicating that a communication failure has occurred, identification information for identifying one of the IFSs 14a to 14x that is the transmission source, and identification information for identifying one of the ports 58a to 58h that transmits the failure notification frame.

Here, the FS 16 described above transmits the failure notification frame from all the ports 46 connected to the IFSs 14. However, the IFS 14 transmits the failure notification frame generated by the failure notification frame generator 70 only from the port 58 that has failed to confirm the reception of the detection frame. Therefore, the failure notification frame is not transmitted from the port 58 receiving the detection frame.

The port 58 receiving the detection frame from the FS 16 transmits the detection frame even after the occurrence of the failure.

Note that, as a method of informing the FSs 16a to 16h that a failure has occurred in the communication state, there is also a method in which the failure determiner 68 stops transmitting the detection frame from the port 58 that has failed to confirm the reception of the detection frame instead of causing the failure notification frame generator 70 to generate the failure notification frame. Such an operation example of the failure determiner 68 is described later in more detail.

In this embodiment, the LAG setter 64 updates the LAG setting table 62b in order to prevent the network frame from being discarded due to the communication failure that has occurred. Specifically, when the failure notification frame is received on one of the ports 58a to 58h from one of the connected FSs 16a to 16h, the LAG setter 64 excludes (deletes) identification information indicating one of the FSs 16a to 16h that is the transmission source and the corresponding one of the ports 58a to 58h from the LAG setting table 62b. In other words, the LAG setter 64 excludes the port 58 that has received the failure notification frame from membership of the LAG 18.

Then, the LAG setting table 62b updated by the LAG setter 64 is newly stored (overwritten) in the memory 62.

Further, the frame transfer processor 60 references the updated LAG setting table 62b to transmit the network frame to the connected FSs 16a to 16h.

Therefore, the network frame that was transmitted/received on the above-mentioned port 58 (port 58 that has received the failure notification frame) until the occurrence of the communication failure comes to be transmitted/received via another port 58 newly decided in accordance with the predetermined algorithm, which prevents the frame from being discarded. This is an example of a failure avoidance achieved by degeneracy of the LAGs 18.

Hereinafter, an operation example performed by the network relay system 10 is described by being divided into a plurality of patterns.

(Basic Operation Example)

FIG. 4 is a diagram illustrating a basic operation example of the network relay system 10. Note that, in FIG. 4 and the subsequent figures, for the sake of brevity, some of the IFSs 14a to 14x and the FSs 16a to 16h are omitted from the illustration as appropriate. Meanwhile, the illustration of some of the ports 46a to 46x and the ports 58a to 58h that relate to the description is added in order to facilitate the understanding of the operation example.

In a case where the communication state of the network relay system 10 is satisfactory, the respective IFSs 14a to 14x and the respective FSs 16a to 16h transmit/receive detection frames 72 and 74 to/from each other every predetermined time. Specifically, the detection frame 72 is transmitted from each of the IFSs 14a to 14x to the respective FSs 16a to 16h, while the detection frame 74 is transmitted from each of the FSs 16a to 16h to the respective IFSs 14a to 14x. Note that, the arrows expressed by solid lines and dotted lines in FIG. 4 respectively indicate transmission directions of the detection frames 72 and 74. Further, here, for the sake of brevity, the detection frames 72 and 74 are illustrated only for some of transmission/reception paths (the same applies to the subsequent figures).

As described above, the network relay system 10 causes the respective IFSs 14a to 14x and the respective FSs 16a to 16h to transmit/receive detection frames 72 and 74 to/from each other to thereby monitor the mutual communication state between the ports 58a to 58h and the ports 46a to 46x (including physical lines).

Particularly in this embodiment, one of the LAGs 18a to 18x is set for the ports 58a to 58h of each of the IFSs 14a to 14x, and the detection frame 74 is transmitted from all of the ports 58a to 58h through the respective physical lines.

Therefore, the respective IFSs 14a to 14x and the respective FSs 16a to 16h can confirm the mutual normal communication state by receiving the detection frames 74 and 72, respectively (denoted reference symbols are mentioned in the order of correspondence; the same applies in the following description), within the predetermined time.

In contrast thereto, when any one of the IFSs 14a to 14x or the FSs 16a to 16h fails to confirm the reception of the detection frame 74 or 72 within the predetermined time, the any one of the IFSs 14a to 14x or the FSs 16a to 16h can determine that a failure has occurred in the communication state with respect to the transmission source of the detection frame 74 or 72 whose reception has failed to be confirmed. Such determination is performed by the failure determiner 54 illustrated in FIG. 2 or the failure determiner 68 illustrated in FIG. 3.

Note that, in the following description, the wording "determine that a failure has occurred" may be referred to also as "failure detection".

(Operation Example 1 Performed in Failure Detection)

Figure 5A:
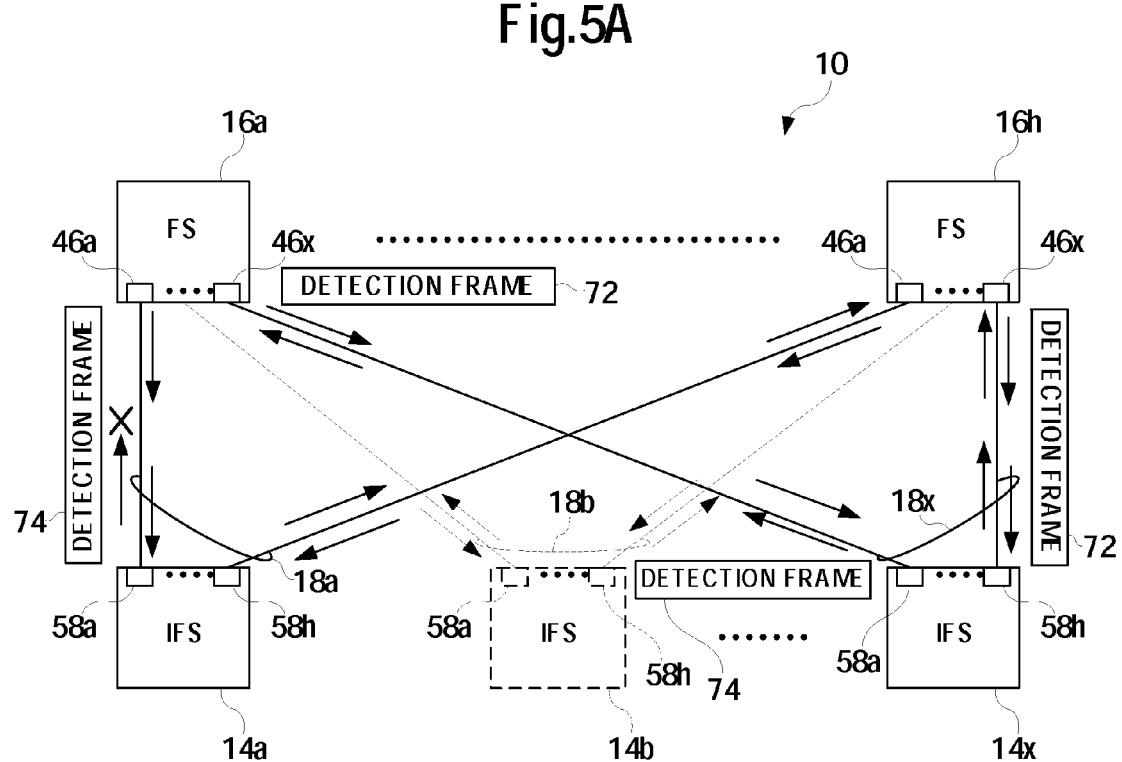
FIGS. 5A and 5B and FIG. 6 are diagrams illustrating Operation Example 1 performed by the network relay system in failure detection.
Figure 5B:
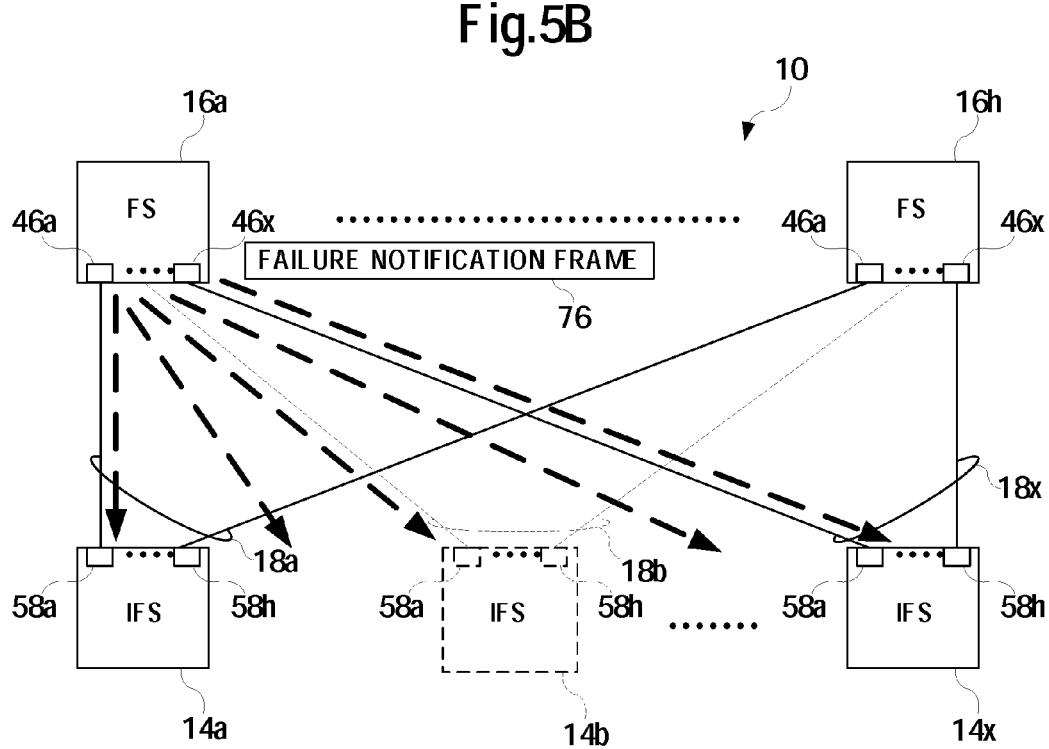
Figure 6:
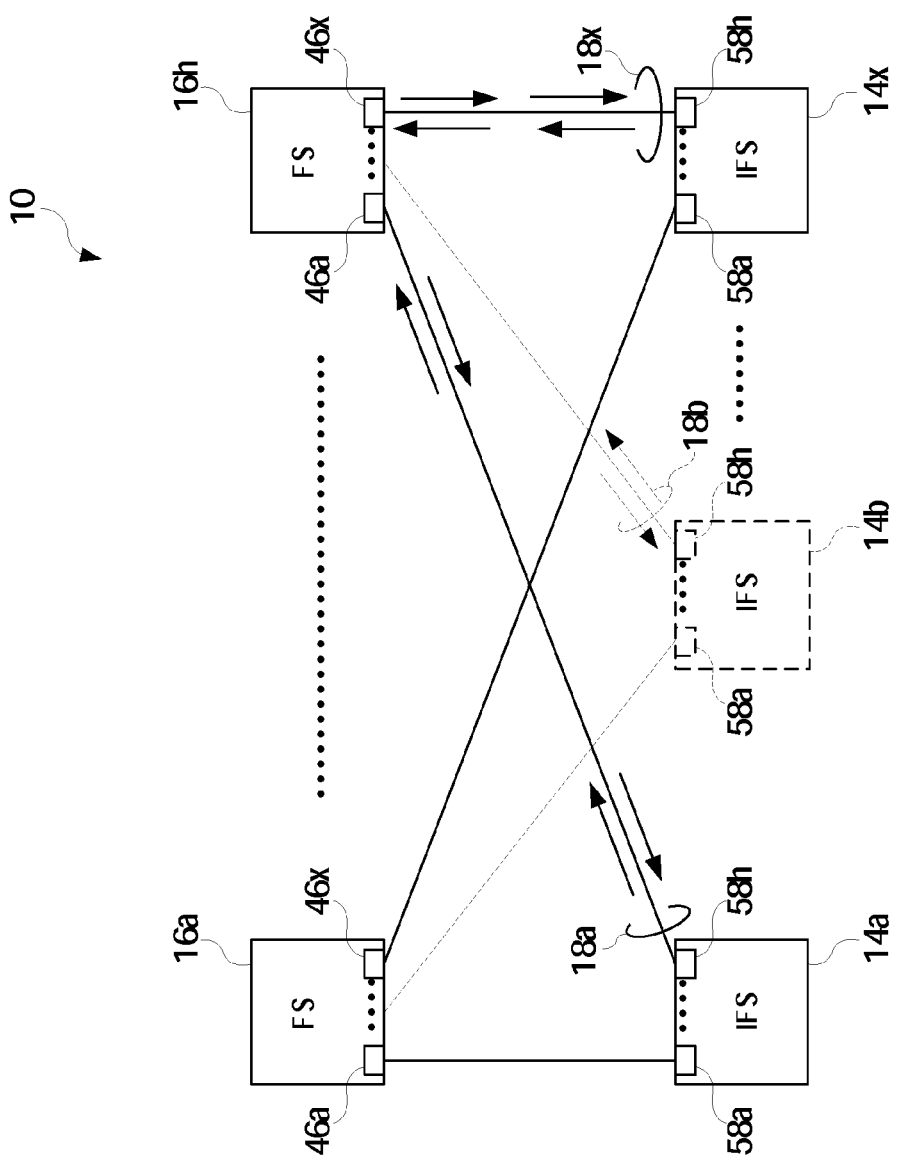

FIGS. 5A and 5B and FIG. 6 are diagrams illustrating Operation Example 1 performed by the network relay system 10 in the failure detection. Here, as an example, description is made of a case where a failure has occurred in the communication state between the IFS 14a and the FS 16a.

As illustrated in FIG. 5A, when a failure (such as a break in the physical line in one way) occurs in the communication state from the IFS 14a with respect to the FS 16a, the detection frame 74 transmitted from the IFS 14a does not reach the FS 16a within the predetermined time. At this time, the FS 16a causes the failure determiner 54 illustrated in FIG. 2 to determine that the failure has occurred in the communication state with respect to the IFS 14a.

As illustrated in FIG. 5B, the FS 16a that has detected the failure transmits a failure notification frame 76 from the respective ports 46a to 46x to the respective IFSs 14a to 14x. Note that, the dotted arrows illustrated in FIG. 5B indicate the transmission directions of the failure notification frames 76.

The failure notification frame 76 is generated by the failure notification frame generator 56 illustrated in FIG. 2. At this time, the failure notification frame 76 includes not only the information indicating that the communication failure has occurred and the identification information for identifying the FS 16a but also the identification information on the respective ports 46a to 46x used at the time of transmission.

(Time of Reception of Failure Notification Frame)

As illustrated in FIG. 6, when the respective IFSs 14a to 14x receive the failure notification frame 76 from the FS 16a, the port 58a that has received the failure notification frame 76 is excluded from the membership of each of the LAGs 18a to 18x.

Specifically, the LAG setter 64 of each of the IFSs 14a to 14x resets the link aggregation group by excluding the port 58a from the membership. In other words, the LAG setters 64 of the respective IFSs 14a to 14x regroup the respective LAGs 18a to 18x. Note that, FIG. 6 does not illustrate all the physical lines within each of the LAGs 18a to 18x, but the ports 58b to 58h that are not excluded from the membership belong to each of the LAGs 18a to 18x. Further, in FIG. 6, the arrows illustrated along the physical lines indicate the transmission directions of not only the detection frames 72 and 74 but also the network frames.

Therefore, the network frame that was transmitted from the port 46a until the occurrence of the failure comes to be transmitted from a port (for example, port 46b) that is newly decided in accordance with the predetermined algorithm from among the other ports 46b to 46h that form each of the LAGs 18a to 18x. With this arrangement, the communication band of each of the LAGs 18a to 18x temporarily reduces, but it is possible to continue the communication and prevent the frame from being discarded.

(Method of Realizing Operation Example 1)

Figure 7:
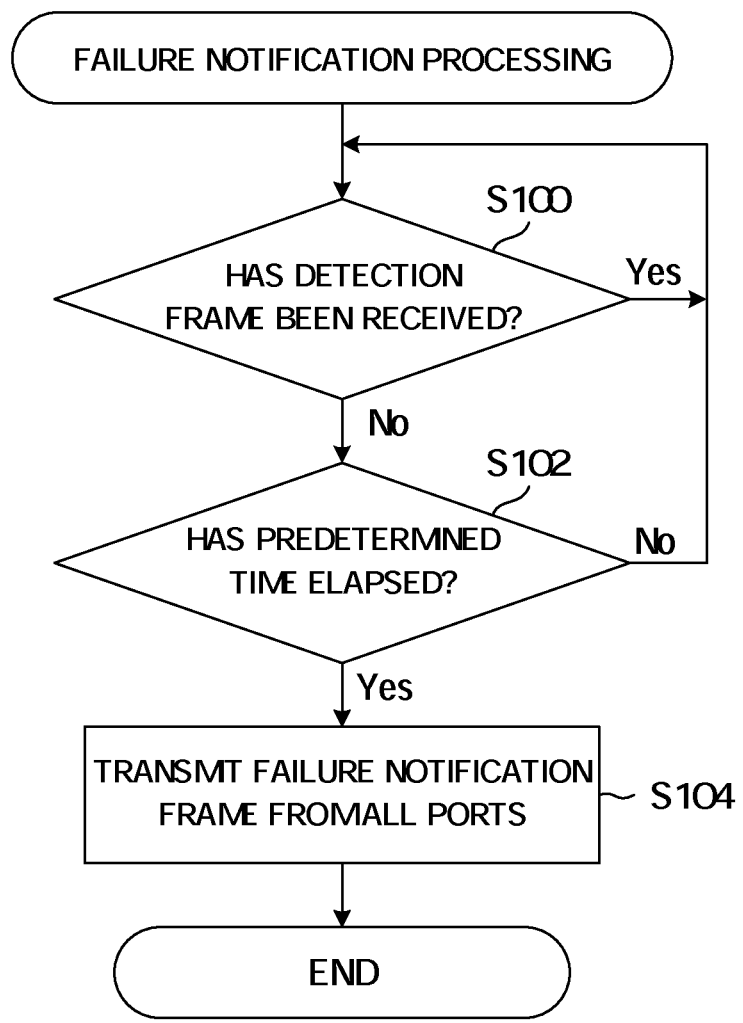
FIG. 7 is a flowchart illustrating a method of realizing failure notification illustrated in FIGS. 5A and 5B.

FIG. 7 is a flowchart illustrating a method of realizing failure notification illustrated in FIGS. 5A and 5B. Further, FIG. 8 is a flowchart illustrating a method of realizing resetting of the link aggregation group illustrated in FIG. 6.

(Failure Notification Processing)

First, description is made of a method of realizing the failure notification performed by the FS 16 according to Operation Example 1.

In a failure notification processing illustrated in FIG. 7, the failure determiner 54 of the FS 16 confirms whether or not the detection frame 74 has been received on each of the ports 46a to 46x (Step S100). When the reception of the detection frame 74 has been confirmed (Yes), the processing is repeated.

When any one of the ports 46a to 46x fails to confirm the reception of the detection frame 74 (Step S100: No), the failure determiner 54 of the FS 16 confirms whether or not a predetermined time has elapsed (Step S102). When the reception of the detection frame 74 has been confirmed within the predetermined time (Step S102: No), Steps S100 to S102 are repeated.

When the predetermined time has elapsed (Step S102: Yes) without successfully confirming the reception of the detection frame 74 (Step S100: No), the failure notification frame generator 56 of the FS 16 generates the failure notification frame 76. Then, the FS 16 transmits the failure notification frame 76 from all the ports 46a to 46x connected to the IFSs 14a to 14x(flooding) (Step S104), and then finishes the processing (END).

(Lag Resetting Processing)

Next, description is made of a method of realizing the resetting of the link aggregation group performed by the IFS 14a according to Operation Example 1.

In an LAG resetting processing illustrated in FIG. 8, the failure determiner 68 of the IFS 14a confirms whether or not the failure notification frame 76 has been received on each of the ports 58a to 58h connected to the respective FSs 16a to 16h (Step S200). When the failure notification frame 76 has not been particularly received (No), the processing is temporarily finished here.

When it is confirmed that the failure notification frame 76 has been received (Step S200: Yes), the LAG setter 64 performs regrouping by excluding the port (here, port 58a) that has received the failure notification frame 76 from the membership of the LAG 18a (Step S202), and finishes the processing. Note that here, the failure notification frame 76 is steadily monitored in Step S200, but without particularly providing Step S200 described above, Step S202 and the subsequent processing may be executed in a sequential manner with the reception of the failure notification frame 76 as a trigger.

FIGS. 9A and 9B are diagrams illustrating the LAG setting table 62b of each of the IFSs 14a to 14x obtained before and after a communication failure occurs in Operation Example 1.

(Before Failure Occurrence)

As illustrated in the "LAG assigned port" field of FIG. 9A, before the failure occurrence, all the ports 58a to 58h are set in the LAG setting table 62b of the IFS 14a as LAG assigned ports (members) belonging to the LAG Further, as illustrated in the "LAG ID" field, all the ports 58a to 58h belong to the common LAG 18a. Note that, in this embodiment, one LAG is set for each of the IFSs 14a to 14x, but a plurality of LAGs may be set.

(After Failure Occurrence)

When the IFS 14a receives the failure notification frame 76 on the port 58a from the FS 16a, as illustrated in FIG. 9B, the regrouping (updating) is performed by excluding the port 58a from the membership belonging to the LAG 18a. As a result, in the "LAG assigned port" field, the ports 58b to 58h excluding the port 58a are reset as the members belonging to the LAG 18a after the updating.

(Summary of Operation Example 1)

As described above, according to Operation Example 1, the FS 16 that has detected the occurrence of the failure transmits the failure notification frame to the IFSs 14, while the IFSs 14 perform the operation of excluding the port that has received the failure notification frame from the LAGs, and hence the FS 16 connected to the communication path in which the failure has occurred is removed from the communication path to be used. That is, in Operation Example 1, when a communication failure occurs, the communication path for the network frame which passes through a segment in which the failure has occurred is switched to another communication path. This can improve reliability of the communication between the plurality of terminal devices 12 connected to different IFSs 14a to 14x.

Further, at the time of failure occurrence, structures of the respective LAGs 18a to 18x temporarily degenerate, but it is possible to continue relaying the network frame being transmitted/received between the terminal devices 12 by applying the above-mentioned algorithm within the LAGs 18a to 18x after the regrouping.

Note that, when recovery work for the physical line and the port is performed after that, by recovering settings of the LAGs 18a to 18x to the initial state, it is possible to restart relaying the network frame efficiently by using the entire band.

Operation Example 1 described above relates to the time of failure occurrence in the direction from the IFS 14 to the FS 16. In contrast thereto, Operation Examples 2 and 3 described below relate to the time of failure occurrence in the direction from the FS 16 to the IFS 14.

(Operation Example 2 Performed in Failure Detection)

FIGS. 10A and 10B and FIGS. 11A and 11B are diagrams illustrating Operation Example 2 performed by the network relay system 10 in the failure detection. Here, as an example, description is made of a case where a failure has occurred in the communication state between the IFS 14a and the FS 16a, but this example is different in the direction of communication in which the failure has occurred.

As illustrated in FIG. 10A, when a failure occurs in the communication state from the FS 16a with respect to the IFS 14a, the detection frame 72 transmitted from the FS 16a does not reach the IFS 14a within the predetermined time. At this time, the IFS 14a causes the failure determiner 64 illustrated in FIG. 3 to determine that the failure has occurred in the communication state with respect to the FS 16a.

Then, as illustrated in FIG. 10B, the IFS 14a that has detected the failure causes the failure notification frame generator 70 illustrated in FIG. 3 to generate a failure notification frame 78, and transmits the failure notification frame 78 from the port 46a to the FS 16a.

Figure 11A:
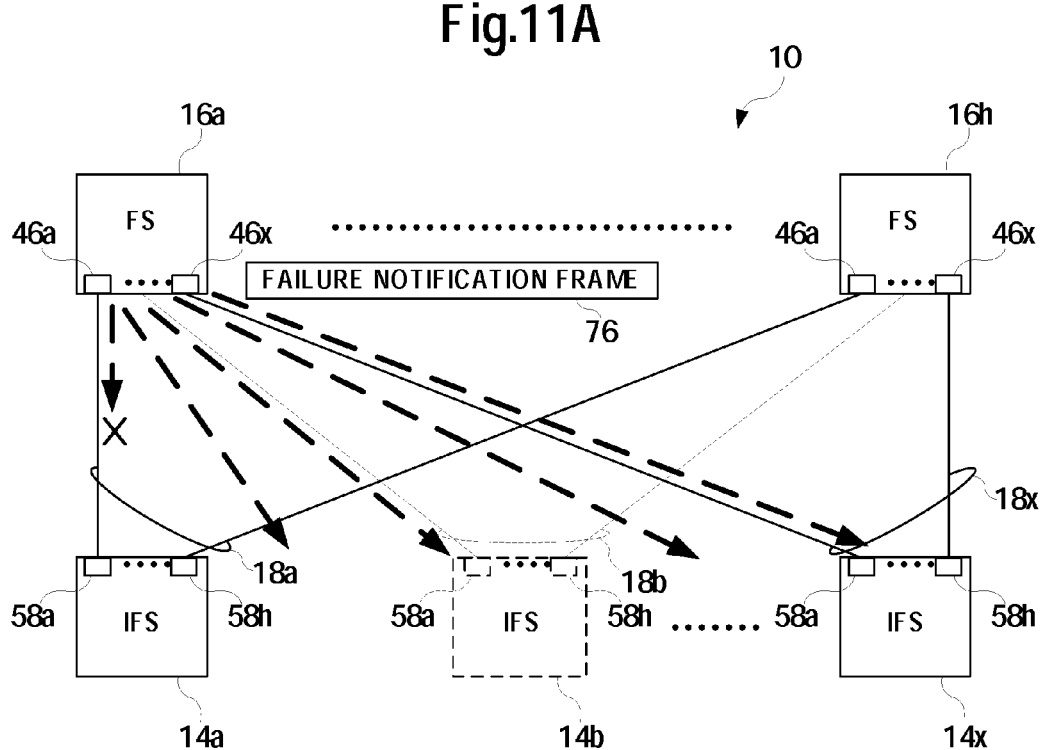

As illustrated in FIG. 11A, the FS 16*a* that has received the failure notification frame 78 transmits the failure notification frame 76 from all the ports 58*a* to 58*h* to the IFSs 14*a* to 14*x*. Note that, the failure notification frame 76 is generated by the failure notification frame generator 56 of the FS 16*a*.

Figure 11B:
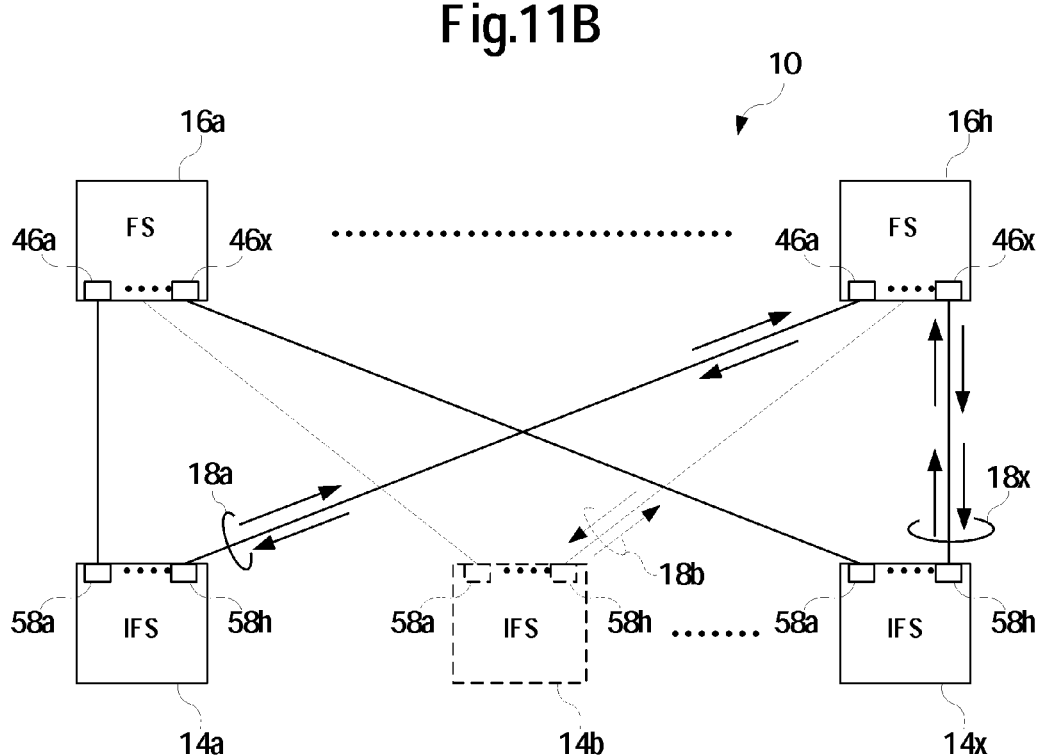

Note that, the failure notification frame 76 transmitted from the FS 16*a* does not reach the IFS 14*a* that is experiencing a failure with respect to the FS 16*a*. Therefore, the LAG setter 64 of the IFS 14*a* resets the LAG 18*a* by excluding the port 58*a* connected to the FS 16*a*. FIG. 11B illustrates a state in which the LAG 18*a* has been reset.

Then, as illustrated in FIG. 11B, when the respective IFSs 14*b* to 14*x* other than the IFS 14*a* receive the failure notification frame 76 transmitted from the FS 16*a*, the port 46*a* that has received the failure notification frame 76 is excluded from the membership of each of the LAGs 18*a* to 18*x*. That is, the LAG setter 64 of each of the IFSs 14*b* to 14*x* regroups each of the LAGs 18*a* to 18*x* by excluding the port 46*a* from the membership.

(Method of Realizing Operation Example 2)

FIG. 12 is a flowchart illustrating a method of realizing failure notification illustrated in FIGS. 10A and 10B. Further, FIG. 13 is a flowchart illustrating a method of realizing the failure notification illustrated in FIGS. 11A and 11B.

(Failure Notification Processing (1))

In a failure notification processing (1) illustrated in FIG. 12, the failure determiner 68 of the IFS 14 confirms whether or not the detection frame 72 has been received on each of the ports 58*a* to 58*h* (Step S300). When the reception of the detection frame 72 has been confirmed (Yes), the failure determiner 68 repeats the processing.

When any one or all of the ports 58*a* to 58*h* fails to confirm the reception of the detection frame 72 (Step S300: No), the failure determiner 68 of the IFS 14 confirms whether or not a predetermined time has elapsed (Step S302). When the reception of the detection frame 72 has been confirmed within the predetermined time (Step S302: No), Steps S300 to S302 are repeated.

When the predetermined time has elapsed (Step S302: Yes) without successfully confirming the reception of the detection frame 72 (Step S300: No), the failure notification frame generator 70 of the IFS 14 generates the failure notification frame 78. Then, the IFSs 14 transmits the failure notification frame 78 from the port 58*a* to the FS 16*a* from which the reception of the detection frame 72 has failed to be confirmed (Step S304).

Then, the LAG setter 64 of the IFS 14*a* performs the regrouping (updating) of the LAG 18*a* by excluding, from the membership, the port (here, port 58*a*) that has not confirmed the reception of the detection frame 72 within the predetermined time (Step S306), and finishes the processing.

(Failure Notification Processing (2))

Then, in a failure notification processing (2) illustrated in FIG. 13, the failure determiner 54 of the FS 16 confirms whether or not the failure notification frame 78 has been received on each of the ports 46*a* to 46*x* (Step S400).

Upon reception of the failure notification frame 78 (Step S400: Yes), the failure notification frame generator 56 of the FS 16 generates the failure notification frame 76. Then, the failure notification frame 76 is transmitted from all the ports 46*a* to 46*x* connected to the IFSs 14*a* to 14*x*(Step S402), and the processing is finished (END).

Note that, the failure notification frame 76 transmitted from the FS 16*a* does not reach the IFS 14*a* that is experiencing a failure with respect to the FS 16*a*, but it is possible to continue the communication with the other FSs 16*b* to 16*h* because the IFS 14*a* has reset the LAG 18*a* by excluding the port 58*a* as described above.

Further, when the other IFSs 14*b* to 14*x* receive the failure notification frame 76 transmitted from the FS 16*a*, each of the IFSs 14*b* to 14*x* executes the LAG resetting processing illustrated in FIG. 8 to perform the resetting (regrouping) by excluding the port 46*a* from each of the LAGs 18*b* to 18*x*.

(Summary of Operation Example 2)

As described above, according to Operation Example 2, when the respective IFSs 14*a* to 14*x* detect a failure, by transmitting the failure notification frame 78 to one of the FSs 16*a* to 16*h* that is the transmission source of the detection frame 72 whose reception has not been confirmed, it is possible to cause the failure notification frame 76 to be transmitted from the one of the FSs 16*a* to 16*h*.

Further, in the same manner as in Operation Example 1, it is possible to continue relaying the network frame even after the degeneracy of the LAGs 18*a* to 18*x*.

(Operation Example 3 Performed in Failure Detection)

FIGS. 14A and 14B and FIGS. 15A and 15B are diagrams illustrating Operation Example 3 performed by the network relay system 10 in the failure detection. Also here, in the same manner as in Operation Example 2, description is made of a case where a failure occurs in the communication state from the FS 16*a* with respect to the IFS 14*a*.

As illustrated in FIG. 14A, when a failure occurs in the communication in the direction from the FS 16*a* to the IFS 14*a*, the detection frame 72 transmitted from the FS 16*a* does not reach the IFS 14*a* within the predetermined time. At this time, the IFS 14*a* causes the failure determiner 68 to determine that a failure has occurred in the communication state with respect to the FS 16*a*.

In this case, as illustrated in FIG. 14B, the IFS 14*a* stops transmitting the detection frame 74 to the FS 16*a*. Further, at this time, the IFS 14*a* performs the resetting (regrouping) by excluding the port 46*a* connected to the FS 16*a* from the membership of the LAG 18*a*. Further, as illustrated in FIG. 14B, due to the stopped transmission of the detection frame 74, the FS 16*a* is no longer able to receive the detection frame 74 on the port 46*a* connected to the IFS 14*a* within the predetermined time. Therefore, the failure determiner 54 of the FS 16*a* determines that a failure has occurred in the communication state with respect to the IFS 14*a*.

Figure 15A:
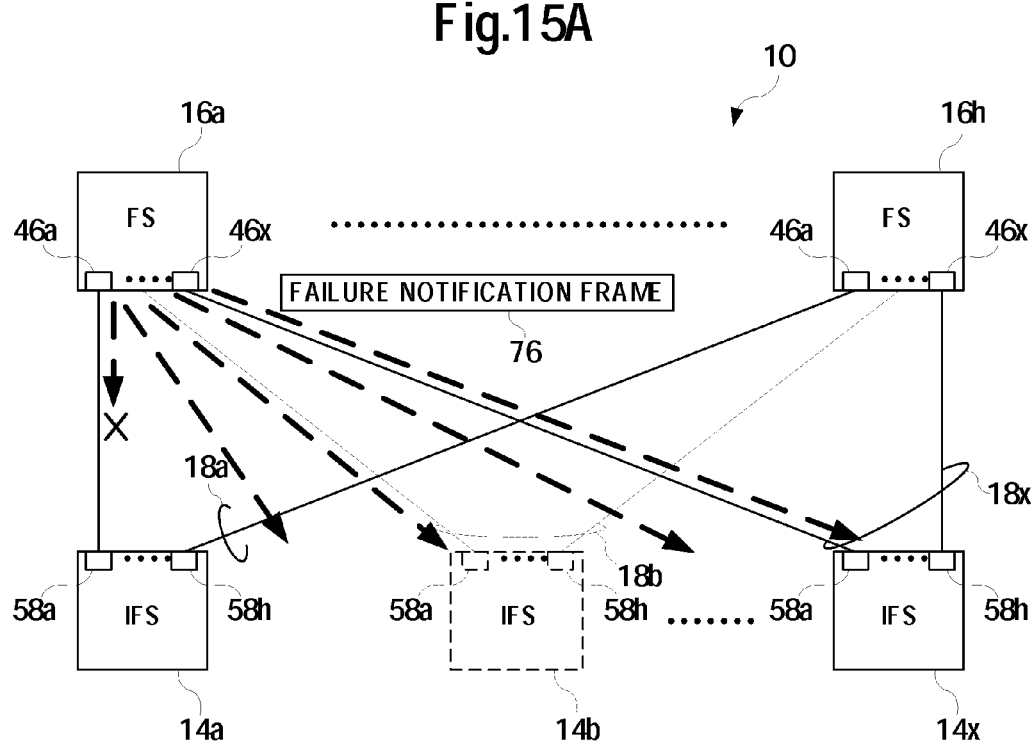

Then, as illustrated in FIG. 15A, in the same manner as in Operation Example 1 and Operation Example 2 described above, the FS 16*a* causes the failure notification frame generator 56 to generate the failure notification frame 76, and transmits the failure notification frame 76 from all the ports 46*a* to 46*x* connected to the IFSs 14*a* to 14*x*.

Also here, in the same manner, the failure notification frame 76 transmitted from the FS 16*a* does not reach the IFS 14*a* that is experiencing a failure with respect to the FS 16*a*, but it is possible to continue the communication with the other FSs 16*b* to 16*h* because the IFS 14*a* has reset the LAG 18*a* by excluding the port 58*a* as described above.

Figure 15B:
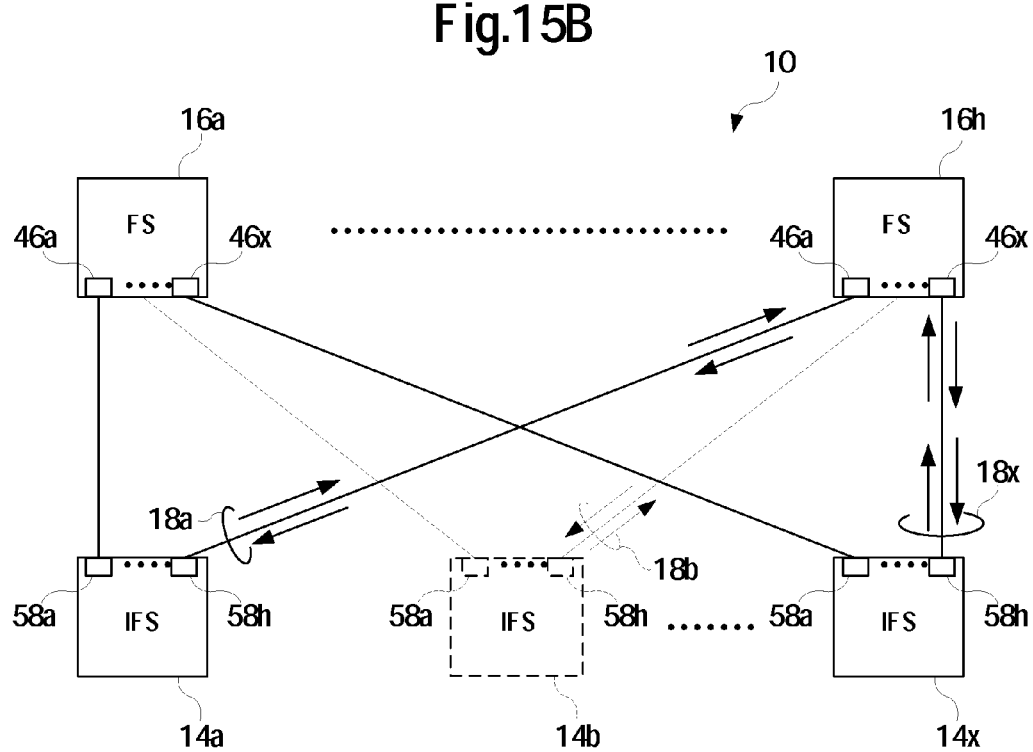

Further, as illustrated in FIG. 15B, when the other IFSs 14*b* to 14*x* receive the failure notification frame transmitted from the FS 16*a*, each of the LAGs 18*b* to 18*x* is reset by excluding the port 46*a* that has received the failure notification frame.

As described above, when the resetting of the LAG 18*a* is performed in the IFS 14*a* that has detected a failure and at the same time the resetting of the LAGs 18*b* to 18*x* is performed in the other IFSs 14*b* to 14*x*, the respective IFSs 14*a* to 14*x* make a decision on the port to be newly used to transfer the network frame that was transferred from the port 46*a* before the failure occurrence. Therefore, the above-mentioned port to be newly used to transfer the network frame is decided in accordance with the predetermined algorithm from among the other ports 46*b* to 46*h* that belong to the LAGs 18*a* to 18*x* in the respective IFSs 14*a* to 14*x*.

(Method of Realizing Operation Example 3)

FIG. 16 is a flowchart illustrating a method of realizing failure notification illustrated in FIGS. 14A and 14B.

(Failure Notification Processing)

The failure determiner 68 of the IFS 14 confirms whether or not the detection frame 72 has been received on each of the ports 58*a* to 58*h* (Step S500). When the reception of the detection frame 72 has been confirmed (Yes), the failure determiner 68 repeats the processing.

When any one of the ports 58*a* to 58*h* fails to confirm the reception of the detection frame 72 (Step S500: No), the failure determiner 68 of the IFS 14 confirms whether or not a predetermined time has elapsed (Step S502). When the reception of the detection frame 72 has been confirmed within the predetermined time (Step S502: No), Steps S500 to S502 are repeated.

When the predetermined time has elapsed (Step S502: Yes) without successfully confirming the reception of the detection frame 72 (Step S500: No), the LAG setter 64 of the IFS 14 resets one of the LAGs 18*a* to 18*x*(Step S504) by excluding, from the membership, the port (here, ports 46) that has not confirmed the reception of the detection frame 72.

Then, the detection frame generator 66 of the IFS 14 stops transmitting the detection frame 74 from the port that has not confirmed the reception of the detection frame 72 (Step S506). Specifically, the generation of the detection frame 72 to be transmitted from the port 58*a* excluded from the LAG 18*a* is aborted, and the transmission of the detection frame from the port 58*a* is stopped to finish the processing (END).

After that, the FS 16*a* from which the transmission of the detection frame 72 has been stopped transmits the failure notification frame 76 from all the ports 46*a* to 46*x* based on the failure notification processing illustrated in FIG. 7. Further, when the IFSs 14*b* to 14*x* other than the IFS 14*a* receive the failure notification frame 76 transmitted from the FS 16*a*, the resetting (regrouping) of the LAGs 18*b* to 18*x* is performed by excluding the port that has received the failure notification frame 76 from the membership based on the LAG resetting processing illustrated in FIG. 8.

(Summary of Operation Example 3)

As described above, according to Operation Example 3, when the respective IFSs 14*a* to 14*x* detect a failure, by stopping transmitting the detection frame 74 to one of the FSs 16*a* to 16*h* that is the transmission source of the detection frame 72 whose reception has not been confirmed, it is possible to cause the failure to be detected by the one of the FSs 16*a* to 16*h* on the other end to thereby cause the failure notification frame 76 to be transmitted from the FSs 16*a* to 16*h*.

Further, in the same manner as in Operation Example 1, it is possible to continue relaying the network frame even after the degeneracy of the LAGs 18*a* to 18*x*.

As described above, according to the network relay system 10 of this embodiment, the communication state between the respective IFSs 14*a* to 14*x* and the respective FSs 16*a* to 16*h* is monitored at all times, and when a failure occurs in the communication path, the failure is detected. When the failure is detected, the network frame passing through the communication path in which the failure has occurred can be switched and transferred to another communication path, which can contribute to improvement in reliability of the communication.

As a modified example, the FS 16 may be configured to monitor link states of the ports 46 connected to the IFSs 14 and transmit the failure notification frame to the IFSs 14 with a fact that one of the ports 46 has entered a link down state as a trigger.

What is claimed is:

1. A network relay system, comprising:
 a plurality of interface switches; and
 a plurality of fabric switches connected to the plurality of interface switches, wherein the plurality of fabric switches are not connected to each other and are connected only to the plurality of interface switches, and
 wherein the plurality of interface switches each comprises a LAG setter which sets a link aggregation group for ports connected to the plurality of fabric switches;
 wherein the plurality of fabric switches each comprises a failure notification frame transmitter which transmits a first failure notification frame to the plurality of interface switches; and
 wherein the LAG setter of each of the plurality of interface switches excludes a port that has received the first failure notification frame from the link aggregation group in a case where the first failure notification frame has been received.

2. The network relay system according to claim 1, wherein:
 the plurality of interface switches each further comprises a first detection frame transmitter which transmits a first detection frame to the plurality of fabric switches;
 the plurality of fabric switches each further comprises a second detection frame transmitter which transmits a second detection frame to the plurality of interface switches;
 the plurality of interface switches each further comprises:
 a first failure determiner which determines that a failure has occurred in a case where reception of the second detection frame has failed to be confirmed; and
 a failure notifier which notifies one of the plurality of fabric switches connected to a port which has failed to confirm the reception of the second detection frame that the failure has occurred in a case where the first failure determiner determines that the failure has occurred;
 the plurality of fabric switches each further comprises a second failure determiner which determines that a failure has occurred in one of a case of failing to confirm reception of the first detection frame and a case of being notified that the failure has occurred by any one of the plurality of interface switches; and
 the failure notification frame transmitter of each of the plurality of fabric switches transmits the first failure notification frame in a case where a corresponding second failure determiner determines that the failure has occurred.

3. The network relay system according to claim 2, wherein the LAG setter of each of the plurality of interface switches excludes the port that has failed to confirm the reception of the second detection frame from the link aggregation group in the case where the first failure determiner determines that the failure has occurred.

4. The network relay system according to claim 2, wherein the failure notifier of each of the plurality of interface switches transmits a second failure notification frame from the port that has failed to confirm the reception of the second detection frame to thereby notify the one of the plurality of fabric switches that the failure has occurred.

5. The network relay system according to claim 4, wherein the LAG setter of each of the plurality of interface switches excludes the port that has failed to confirm the reception of the second detection frame from the link aggregation group in the case where the first failure determiner determines that the failure has occurred.

6. The network relay system according to claim 2, wherein the failure notifier of each of the plurality of interface switches stops transmitting the first detection frame from the port that has failed to confirm the reception of the second detection frame to thereby notify the one of the plurality of fabric switches that the failure has occurred.

7. The network relay system according to claim 6, wherein the LAG setter of each of the plurality of interface switches excludes the port that has failed to confirm the reception of the second detection frame from the link aggregation group in the case where the first failure determiner determines that the failure has occurred.

8. A method of controlling a network relay system, the network relay system comprising a plurality of interface switches and a plurality of fabric switches connected to the plurality of interface switches, wherein the plurality of fabric switches are not connected to each other and are connected only to the plurality of interface switches, the method comprising:
   previously setting a link aggregation group for ports connected to the plurality of fabric switches in each of the plurality of interface switches;
   transmitting a first failure notification frame from each of the plurality of fabric switches to the plurality of interface switches; and
   excluding, by each of the plurality of interface switches, a port that has received the first failure notification frame from the link aggregation group in a case where the interface switch has received the first failure notification frame.

9. The method of controlling the network relay system according to claim 8, further comprising:
   transmitting a first detection frame from each of the plurality of interface switches to the plurality of fabric switches;
   transmitting a second detection frame from each of the plurality of fabric switches to the plurality of interface switches;
   determining, by each of the plurality of interface switches, that a failure has occurred in a case where the interface switch has failed to confirm reception of the second detection frame, and notifying, by the interface switch, one of the plurality of fabric switches connected to a port which has failed to confirm the reception of the second detection frame that the failure has occurred; and
   determining, by each of the plurality of fabric switches, that a failure has occurred in one of a case where the fabric switch has failed to confirm reception of the first detection frame and a case where the fabric switch has been notified that the failure has occurred by any one of the plurality of interface switches, and transmitting, by the fabric switch, the first failure notification frame.

10. The method of controlling the network relay system according to claim 9, further comprising excluding, by each of the plurality of interface switches, the port that has failed to confirm the reception of the second detection frame from the link aggregation group in a case where the interface switch determines that the failure has occurred.

11. The method of controlling the network relay system according to claim 9, wherein the notifying, by the interface switch, comprises transmitting, by the interface switch, a second failure notification frame from the port that has failed to confirm the reception of the second detection frame.

12. The method of controlling the network relay system according to claim 11, further comprising excluding, by each of the plurality of interface switches, the port that has failed to confirm the reception of the second detection frame from the link aggregation group in a case where the interface switch determines that the failure has occurred.

13. The method of controlling the network relay system according to claim 9, wherein the notifying, by the interface switch, comprises stopping, by the interface switch, transmission of the first detection frame from the port that has failed to confirm the reception of the second detection frame.

14. The method of controlling the network relay system according to claim 13, further comprising excluding, by each of the plurality of interface switches, the port that has failed to confirm the reception of the second detection frame from the link aggregation group in a case where the interface switch determines that the failure has occurred.

* * * * *